(12) United States Patent
Zolekar et al.

(10) Patent No.: US 11,755,811 B2
(45) Date of Patent: Sep. 12, 2023

(54) USE OF TRUNK LINE IN FLATTENING AN ELECTRICAL HARNESS ASSEMBLY DESIGN

(71) Applicant: Dassault Systemes SolidWorks Corporation, Waltham, MA (US)

(72) Inventors: Vivek Zolekar, Pune (IN); Nitin Shirkey, Pune (IN); Satyajeet Patil, Maharashtra (IN); Sameer Bondre, Pune (IN)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 19 days.

(21) Appl. No.: 17/530,076

(22) Filed: Nov. 18, 2021

(65) Prior Publication Data
US 2023/0153509 A1    May 18, 2023

(51) Int. Cl.
*G06F 30/3953* (2020.01)
*G06F 113/16* (2020.01)

(52) U.S. Cl.
CPC ...... *G06F 30/3953* (2020.01); *G06F 2113/16* (2020.01)

(58) Field of Classification Search
USPC ........................................................ 716/126
See application file for complete search history.

(56) References Cited

U.S. PATENT DOCUMENTS

| 9,870,436 B2 | 1/2018 | Lorono |
| 2003/0050723 A1 | 3/2003 | Ozaki |
| 2005/0091628 A1 | 4/2005 | Kragh et al. |
| 2009/0222121 A1* | 9/2009 | Flores ............... G06T 19/00 700/118 |
| 2016/0171125 A1* | 6/2016 | Paul ................ G06F 30/17 703/1 |

OTHER PUBLICATIONS

Dassault Systems; "What's New Solidworks 2021" Apr. 2021.
Dassault Systemes; "Generating Separate Routing Assemblies of Cables" Sep. 2021.
Extended European Search Report for EP22208363.6 dated Apr. 11, 2023.

* cited by examiner

*Primary Examiner* — Bryce M Aisaka
(74) *Attorney, Agent, or Firm* — Sheehan Phinney Bass & Green PA

(57) ABSTRACT

A method is disclosed for creating a flattened version of a three-dimensional electrical harness assembly design in a computer-aided design environment. The method includes storing data in computer memory including route segment identifiers, diameters, lengths, and end points for route segments in the electrical harness assembly. A computer processor designates route segments as forming a trunk line of the electrical harness assembly, based on the stored data, and produces a flattened two-dimensional version of the design. All the route segments designated as forming the trunk line are represented in the flattened 2D version by straight connected lines, having a particular orientation (e.g., horizontal), and every other route segment is represented as extending out from the trunk line. The flattened 2D version is displayed on a display screen of a computer.

18 Claims, 20 Drawing Sheets

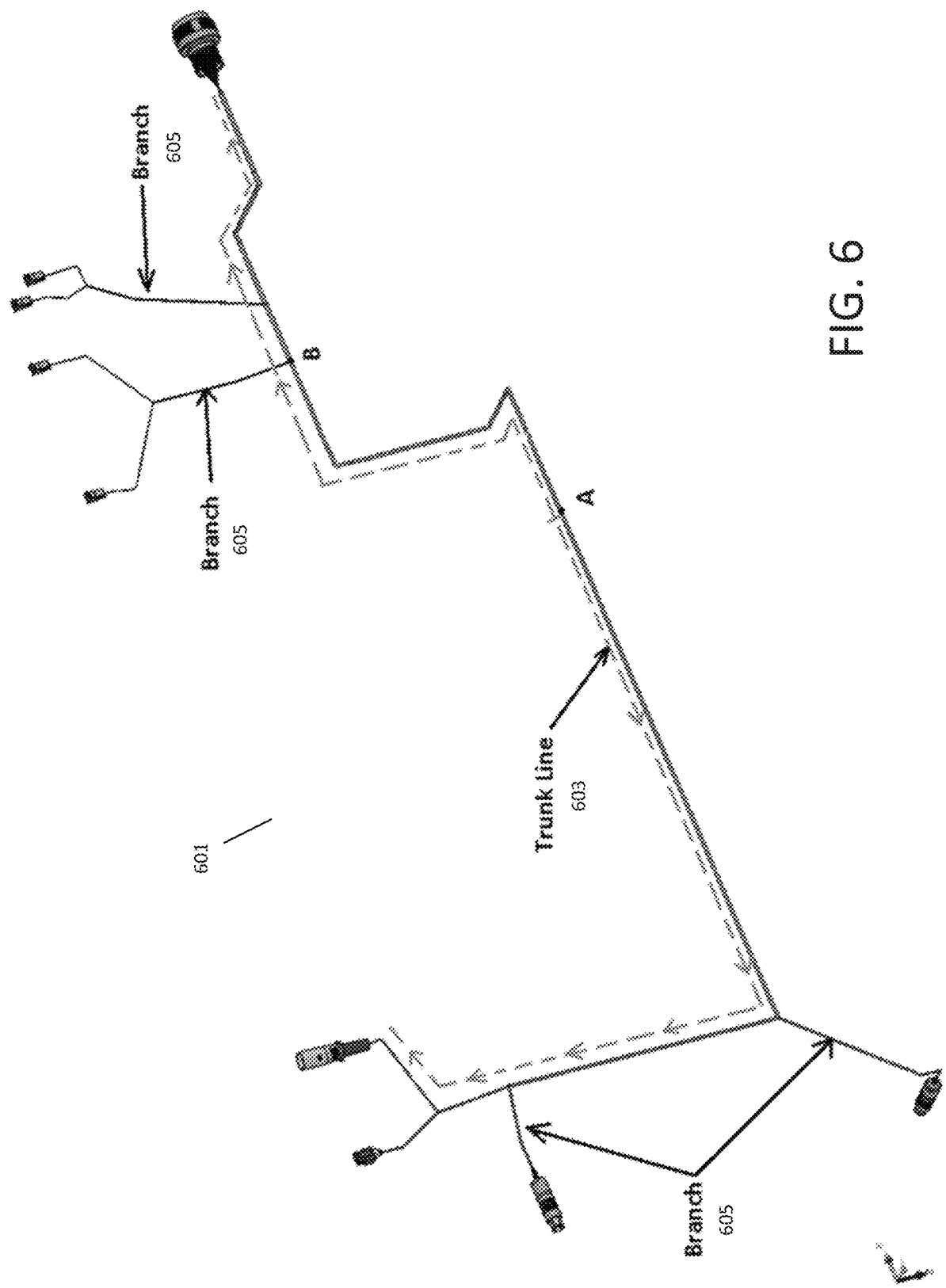

USE OF TRUNK LINE IN FLATTENING AN ELECTRICAL HARNESS ASSEMBLY DESIGN

FIELD OF THE INVENTION

This disclosure relates to the field of design and, more particularly, relates to computer-based systems and methods that involve using a trunk line in flattening electrical harness assembly designs in a computer-aided design environments for example.

BACKGROUND

Computer-aided design (CAD) software can facilitate the design of a great many objects, including electrical harnesses. Electrical harness assembly designs can be flattened from a three-dimensional (3D) format and to a two-dimensional (2D) format. It can be challenging to produce, with flattening, a clear, accurate, and easy-to-understand 2D representation of a 3D electrical harness assembly design, particularly when the electrical harness has many branches extending from its trunk line. Significant time and efforts may be required to edit and/or manipulate the 2D representation, to try to produce a representation that is clear, accurate, and easy-to-understand, and, in many instances, the ultimate end-product of editing and manipulating may still be less than optimal.

SUMMARY OF THE INVENTION

In one aspect, a computer-based method is disclosed for creating a flattened version of a three-dimensional electrical harness assembly design in a computer-aided design environment. The method includes storing data in computer memory including route segment identifiers, diameters, lengths, and end points for route segments in the electrical harness assembly. A computer processor designates route segments as forming a trunk line of the electrical harness assembly, based on the stored data, and produces a flattened two-dimensional version of the design. All the route segments designated as forming the trunk line are represented in the flattened 2D version by straight connected lines, having a particular orientation (e.g., horizontal), and every other route segment is represented as extending out from the trunk line. The flattened 2D version is displayed on a display screen of a computer.

In another aspect, a computer-based system is disclosed for creating a flattened version of a three-dimensional (3D) electrical harness assembly design in a computer-aided design environment. The computer-based system includes one or more computer processing devices; and computer-based memory operatively coupled to the one or more processing devices. The computer-based memory stores computer-readable instructions that, when executed by the one or more processors, cause the computer-based system to: store data in a computer-based memory that identifies route segment identifiers for route segments in the electrical harness assembly design, a diameter for each of the route segments, a length for each of the route segments, and end point locations for each of the route segments; designate, with the one or more computer-based processing devices, one or more of the route segments as forming a trunk line of the electrical harness assembly design, based on the stored data; produce a flattened two-dimensional (2D) version of the electrical harness assembly design; and display the flattened 2D version of the electrical harness assembly design on a display screen of the computer-based system. All the route segments designated as forming the trunk line are represented in the flattened 2D version of the electrical harness assembly design by straight lines, connected to one another, and having a particular orientation on a 2D Cartesian coordinate plane, and each of the route segments not designated as forming the trunk line is represented in the flattened 2D version of the electrical harness assembly design extending out from the trunk line. The orientation of all of the straight lines that represent the route segments designated as forming the trunk line is flat and horizontal on the 2D Cartesian coordinate plane.

In yet another aspect, a non-transitory computer readable medium is disclosed having stored thereon computer-readable instructions that, when executed by a computer-based processor, cause the computer-based processor to create a flattened version of a three-dimensional (3D) electrical harness assembly design in a computer-aided design environment, by: storing data in a computer-based memory that identifies route segment identifiers for route segments in the electrical harness assembly design, a diameter for each of the route segments, a length for each of the route segments, and end point locations for each of the route segments; designating, with a computer-based processor, one or more of the route segments as forming a trunk line of the electrical harness assembly design, based on the stored data; producing a flattened two-dimensional (2D) version of the electrical harness assembly design; and displaying the flattened 2D version of the electrical harness assembly design on a display screen of a computer. All the route segments designated as forming the trunk line are represented in the flattened 2D version of the electrical harness assembly design by straight lines, connected to one another, and having a particular (e.g., horizontal) orientation on a 2D Cartesian coordinate plane, and each of the route segments not designated as forming the trunk line is represented in the flattened 2D version of the electrical harness assembly design extending out from the trunk line.

In some implementations, one or more of the following advantages are present.

For example, in various implementations, the systems and techniques disclosed herein produce a flattened 2D representation of an electrical harness assembly design that is clean, accurate, and easy-to-understand, and does not need much, or any, editing or manipulating for the flattened 2D representation to be useful for its intended purposes. A flattened 2D representation of an electrical harness assembly design created in this manner may be incorporated into a flattened (or formboard) drawing, which is a document that contains various information about an electrical harness assembly design including, for example, the flattened 2D representation of the electrical harness as well as other information, such as wires used, wire connections, wire paths, etc. In a typical implementation, the flattened 2D representation of the electrical harness and other information in the formboard drawing help manufacturers, who reference the formboard drawing during manufacturing, to manufacture the electrical harness and (optionally) any other items that may be represented in the drawing.

Other features and advantages will be apparent from the description and drawings, and from the claims.

BRIEF DESCRIPTION OF THE DRAWINGS

FIG. 6 shows an example of an electrical harness assembly design with its one trunk line and multiple branches identified therein.

Like reference characters refer to like elements.

DETAILED DESCRIPTION

This document uses a variety of terminology to describe its inventive concepts. Unless otherwise indicated, the following terminology, and variations thereof, should be understood as having meanings that are consistent with what follows.

For example, in general, the phrase, "computer-aided design" refers to the use of computers (or workstations) to aid in the creation, modification, analysis, or optimization of a design. A "design" refers to a plan or specification (e.g., drawing), typically stored in computer-based memory, for an object or system, including construction details for that object or system. The SolidWorks® computer program, available from Dassault Systèmes SolidWorks Corporation, the applicant of the current application, is one example of a computer-aided design software program. As used herein, the phrase "computer-aided design" should be construed broadly to include any computer software, device, or system that incorporates or can incorporate electrical harness assembly design flattening capabilities.

The phrase "flattening" refers to a process by which a three-dimensional (3D) representation of a design, or portion thereof, is converted into a two-dimensional (2D) representation in a computer-aided design environment.

The phrase "electrical harness," also referred to as cable harness, wire harness, wiring harness, cable assembly, wiring assembly or wiring loom, refers to an assembly of electrical cables or wires that can transmit electrical signals and/or power. Typically, the cables or wires are bound together, along at least some extent of the electrical harness, by a durable material such as rubber, vinyl, electrical tape, conduit a weave of extruded string, or a combination thereof. An "electrical harness" typically includes a trunk line and multiple branches.

The phrase "trunk line" typically refers to the main portion of an electrical harness represented in a design, from which one or more branches may extend. A trunk line may be identified by a human user (manually) or by a computer algorithm (automatically). In a typical implementation, the trunk line will be the longest continuous length of an electrical harness that has the largest diameter of all route segments. A trunk line may include one or more route segments.

The phrase "branch" refers to one or more electrical cables or wires in an electrical harness that extend from a trunk line. Typically, a branch terminates at an electrical connector or connection point on an electrical component.

"Flattening" an "electrical harness assembly design" refers to a process by which a 3D representation of an electrical harness assembly design, or a portion thereof, is converted into a 2D representation in a computer-aided design environment. In a typical implementation, the length of each route segment and connections in a 3D representation of an electrical harness assembly design are maintained in the flattened 2D representation of the electrical harness assembly design.

Figure 10A:
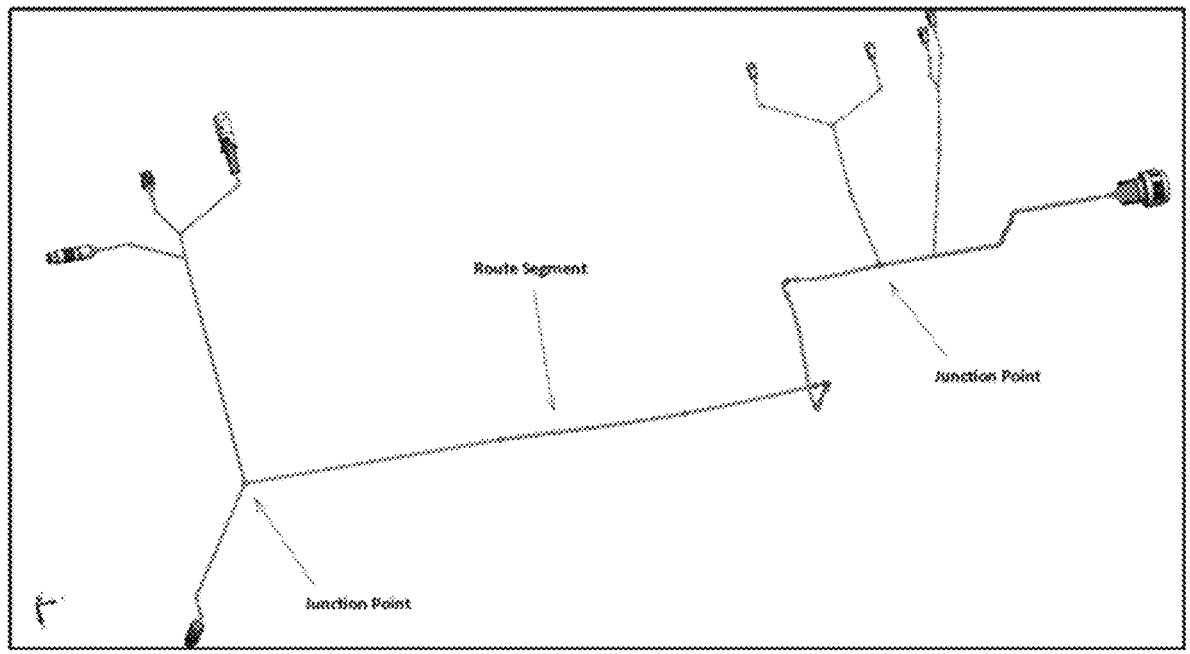
FIG. 10A shows an electrical harness assembly design in which a labeled "route segment" extends between two labeled "junction points."
Figure 10B:
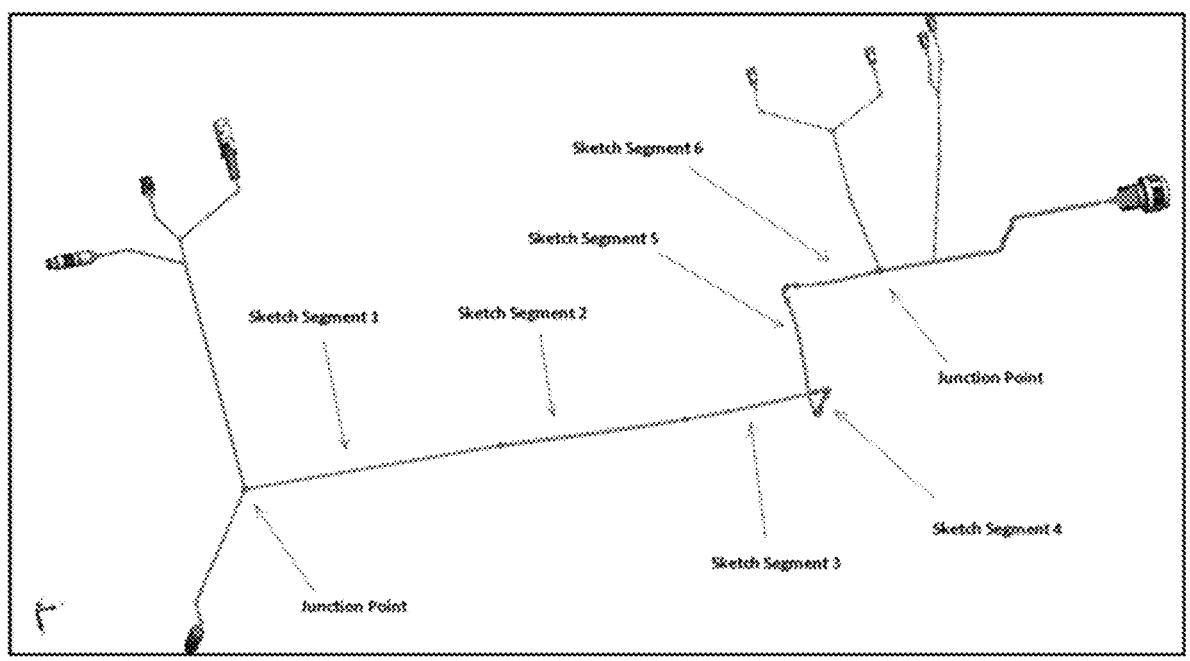
FIG. 10B shows the same electrical harness assembly design with multiple labeled "sketch segments" making up the labeled "route segment" of FIG. 10A.

A "route segment" is a portion of an electrical harness assembly design in a computer-aided design environment. Typically, a route segment includes one or more sketch segments that extend between two junction points containing one or more sketch segments. FIG. 10A shows an electrical harness assembly design in which a labeled "route segment" extends between two labeled "junction points." FIG. 10B shows the same electrical harness assembly design with multiple labeled "sketch segments" (six in total) making up the "route segment." Also typically, a route segment has one or more route properties, stored in computer-based memory, that define one or more characteristics of the route segment, such as diameter, color, wires passing through it, etc.

Figure 11:
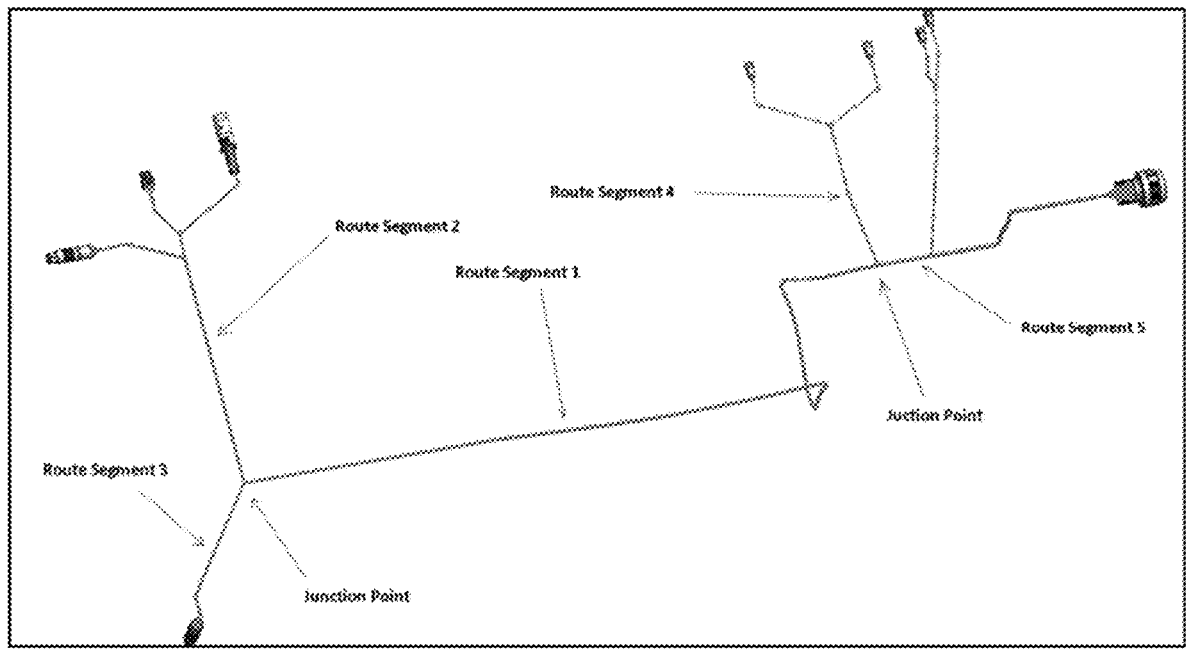
FIG. 11 shows an example of an electrical harness assembly design that has two labeled "junction points" where multiple labeled "route segments" merge.

A "junction point" is a point on an electrical harness assembly design in a computer-aided design environment where multiple route segments merge. FIG. 11 shows an example of an electrical harness assembly design that has two labeled "junction points" where multiple labeled "route segments" merge. Route segments 1, 2, and 3 merge at the leftmost labeled "junction point." Route segments 1, 4, and 5 merge at the rightmost labeled "junction point."

A "reference route segment" is a route segment in an electrical harness assembly design identified as having the largest diameter in the electrical harness assembly design or identified as being the longest route segment with the largest diameter in the electrical harness assembly design.

The phrase "center point" refers to the center position along a length of a trunk line in an electrical harness assembly design.

The phrase "flatten route center" refers to an end of a route segment in an electrical harness assembly design that is closest to the center point of the trunk line of the electrical harness assembly design. In a typical implementation, the trunk line is flattened from its flatten route center.

Figure 12:
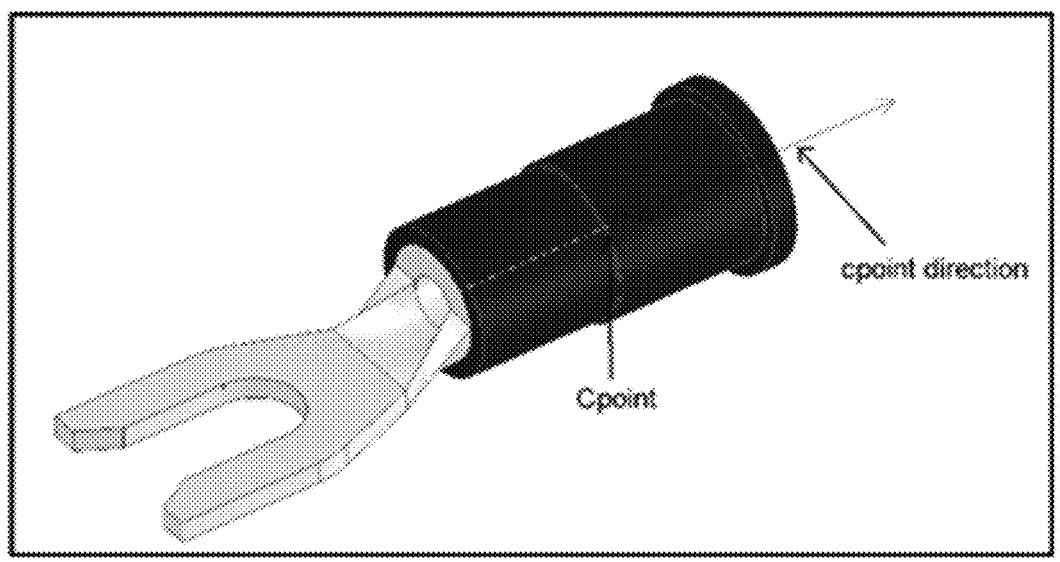
FIG. 12 shows a labeled "cpoint" and "cpoint direction."

A "connection point" or "CPoint" is a point on an electrical harness assembly design in a computer-aided design environment where a wire or core starts. Typically, every connection point has a point and direction (referred to as a "cpoint direction") that may be stored in computer-based memory, for example. An example of this is shown in FIG. 12, which shows a labeled "cpoint" and "cpoint direction." In some implementations, connection points or cpoint directions also have routing properties, such as diameter of the route segment and route type (e.g., electrical, piping, tubing) also stored in computer-based memory.

Figure 13:
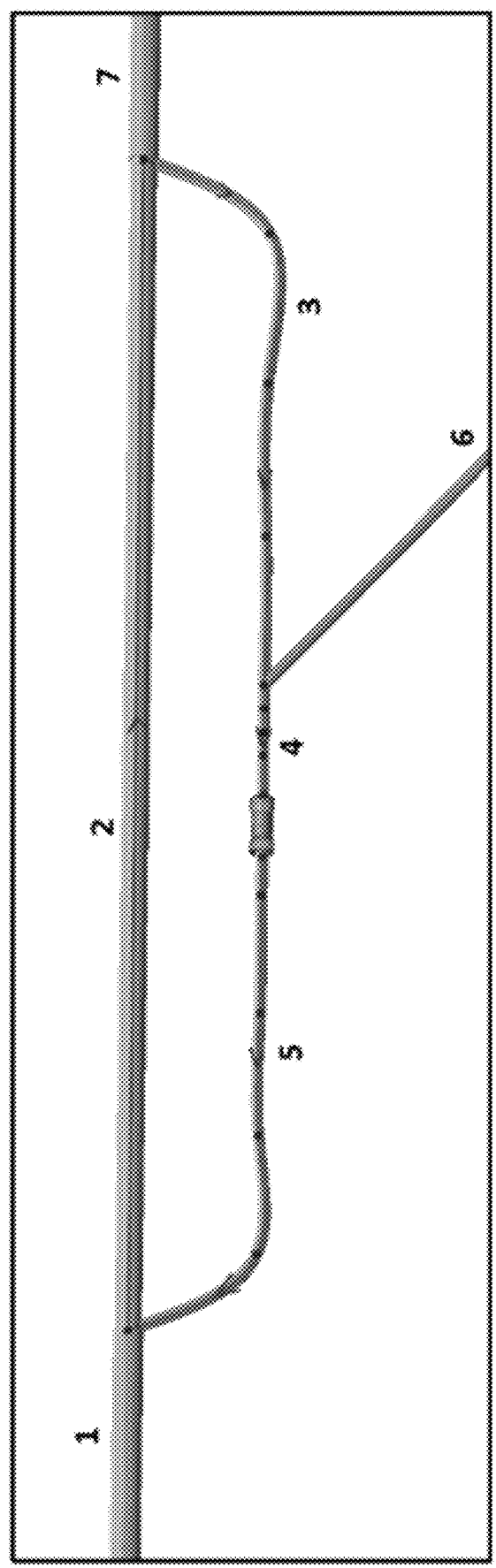
FIG. 13 shows an example of a loop formed by multiple route segments.

The phrase "loop" refers to a portion of an electrical harness assembly design in a computer-aided design environment where route segments connect to each other in such a way that they form a closed path with cyclic connectivity. FIG. 13 shows an example of a loop formed by the route segments labeled 2, 3, 4, and 5. The closed path may be formed by starting at a node, passing through a set of other nodes, and returning to the starting node without passing through any node more than once.

A "splice" is a connection in an electrical harness assembly design between two (or more) electrical cables or wires in a computer-aided design environment. A splice may be modeled in any number of ways including, for example, as a cylinder containing a single connection point.

The phrase "processor" or the like refers to any one or more computer-based processing devices. A computer-based processing device is a physical component that can perform computer functionalities by executing computer-readable instructions stored in memory.

The phrase "memory" or the like refers to any one or more computer-based memory devices. A computer-based memory device is a physical component that can store computer-readable instructions that, when executed by a processor, results in the processor performing associated computer functionalities.

Prior Technologies

Software exists to flatten 3D designs in a computer-aided design environment. For example, the SolidWorks® computer program, available from Dassault Systèmes SolidWorks Corporation, the applicant of the current application, has a routing add-in that facilitates the design of electrical harnesses. The electrical harnesses can be designed in 3D and subsequently converted into 2D for manufacturing, which involves flattening. However, the flattening process in that program did not involve taking into consideration the trunk line, flattening from a center point, and/or orienting the trunk line (e.g., straight and horizontal) in the flattened version, as disclosed herein. Because of these differences, it was not unusual that multiple edit operations needed to be made to a flattened electrical harness assembly design to make the flattened electrical harness assembly design clean and readable to manufacturers and/or to fit within a space having predefined dimensions. The editing operations were time consuming and difficult, especially on larger designs, sometimes requiring multiple iterations, and often leading to errors.

The systems and techniques disclosed herein differ from the prior software in technical approach, execution, and output and, as such, overcome or at least significantly minimize the technical limitations of the prior system. Other technical differences may exist between various prior technologies and the systems and techniques disclosed herein.

Technical Disclosure

Figure 1:
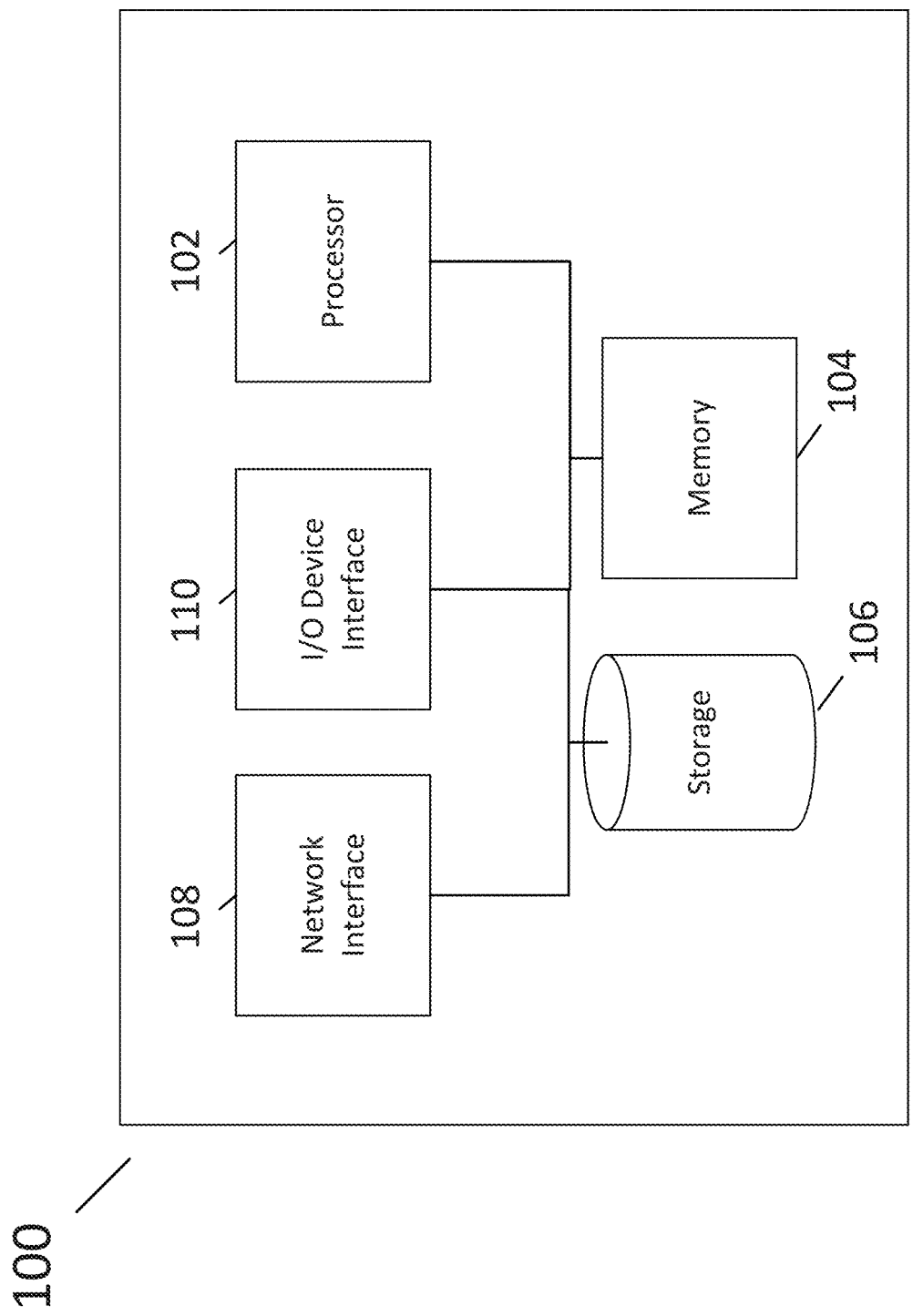
FIG. 1 is a schematic representation of an exemplary computer for creating a flattened version of a three-dimensional (3D) electrical harness assembly design in a computer-aided design environment.

FIG. 1 is a schematic representation of an exemplary computer 100 configured to facilitate the flattening of an electrical harness assembly design from a three-dimensional (3D) format and to a two-dimensional (2D) format. In a typical implementation, the computer 100 performs the flattening process while taking into consideration the trunk line of the electrical harness assembly design and flattening from a center point of the electrical harness. In some instances, the trunk line may be identified by a human user designating certain segments of the electrical harness assembly design as trunk line segments. In some instances, the system 100 automatically identifies the trunk line as the longest continual segment of the electrical harness assembly design that has the largest diameter. In a typical implementation, once the trunk line has been identified, the computer 100 automatically produces the flattened 2D representation of the electrical harness by showing the trunk line in a particular orientation (e.g., flat and horizontal) and adding any branches to the trunk line (e.g., as splines and/or lines).

In a typical implementation, the flattened 2D representation of an electrical harness assembly design produced in this manner is clean, accurate, and easy-to-understand, and does not need much, or any, editing or manipulating for the flattened 2D representation to be easy-to-use for its intended purposes. Often, a flattened 2D representation of an electrical harness assembly design created in this manner is incorporated into a flattened (or formboard) drawing, which is a document that contains various information about an electrical harness assembly design including, for example, the flattened 2D representation of the electrical harness as well as other information, such as wires used, wire connections, wire paths, etc. In a typical implementation, the flattened 2D representation of the electrical harness and other information in the formboard drawing help manufacturers, who reference the formboard drawing during manufacturing, to manufacture the electrical harness and (optionally) any other items that may be represented in the drawing.

Figures 2A, 2B:
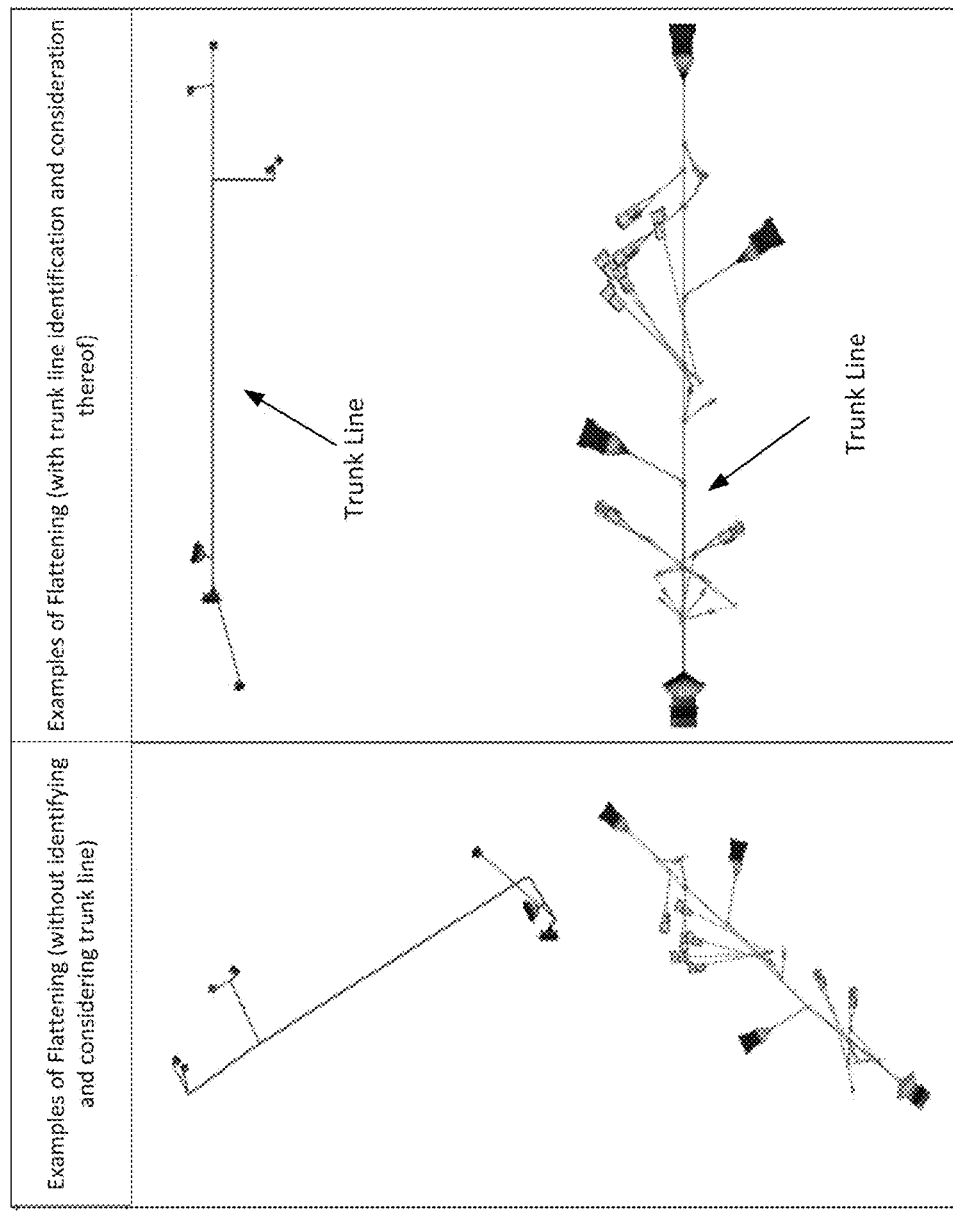
FIGS. 2A and 2B show a side-by-side comparison showing examples of flattened 2D representations of electrical harness assembly designs.

FIGS. 2A and 2B show a side-by-side comparison showing examples of flattened 2D representations of electrical harness assembly designs. The examples in FIG. 2A have been flattened without incorporating the techniques disclosed herein and without any consideration to the electrical harness' trunklines. The examples in FIG. 2B, on the other hand, correspond to the examples in FIG. 2A, but have been flattened using the techniques disclosed herein taking into consideration the electrical harness' trunklines, and flattened, for example, from their center points. As such, the electrical harnesses represented in the examples of FIG. 2B have their trunk lines (which happen to be identified in the figures) lying on a flat and horizontal line with branches extended up or down at different angles from the trunk line. The electrical harness assembly designs represented in the examples of FIG. 2B are accurate, but also cleaner and more readable, with their trunk lines more easily identifiable, than the examples in FIG. 2A.

Referring again to FIG. 1, the computer 100 has a processor 102, computer-based memory 104, computer-based storage 106, a network interface 108, an input/output device interface 110, and a bus that serves as an interconnect between the components of the computer 100. The bus acts as a communication medium over which the various components of the computer 100 can communicate and interact with one another.

The processor 102 is configured to perform the various computer-based functionalities disclosed herein as well as other supporting functionalities not explicitly disclosed herein. Some such functionalities include enabling users to convert 3D versions of electrical harness assembly designs to flattened 2D versions thereof. Typically, the processor enables the users to create the original 3D versions of the electrical harness assembly designs as well. In various implementations, the conversion includes automatically identifying (or enabling a user to identify) a trunk line in a 3D version of the electrical harness assembly design and utilizing the identified trunk line, as well as a center point of the electrical harness, to produce a flattened 2D version of the electrical harness assembly design that is clear, accurate, and highly readable. Typically, the processor 102 performs these, and other, functionalities by executing computer-readable instructions stored on a computer-readable medium (e.g., in 104 or 106). In various implementations, some of these functionalities may be performed with reference to data stored in the computer-readable medium and/or received from some external source (e.g., an input/output (I/O) device via the I/O device interface 110 and/or from an external network via the network interface 108).

The computer 100 has volatile and non-volatile memory. More specifically, in a typical implementation, memory 104 provides a form of volatile storage storing computer-readable instructions that, when executed by the processor 102, cause the processor 102 to perform or facilitate some (or all) of the computer-based functionalities disclosed herein. Moreover, in a typical implementation, storage 106 provides a form of non-volatile memory storing computer-readable instructions, such as instructions to implement an operating system, configuration information, etc. The various system memory resources (e.g., 104, 106) may store data, as well.

In a typical implementation, the memory 104 stores computer-readable instructions that, when executed by the processor 102, cause the processor 102 to execute functionalities that present to a user at the computer 100 a computer-aided design program, with the functionalities disclosed herein incorporated therein. An example of a computer-aided design program suitable for adapting to incorporate the functionalities disclosed herein is the SolidWorks® computer program, available from Dassault Systèmes SolidWorks Corporation, the applicant of the current application. The computer-aided design program, so adapted, would include design flattening functionalities disclosed herein that efficiently flatten or convert 3D electrical harness assembly designs into clean, readable, and highly useful 2D versions of the electrical harness assembly designs. In some implementations, the processor 102 identifies (or enables a user to identify) the trunk line and center point of the electrical harness assembly design automatically and represents the trunk line in a flattened 2D version of the electrical harness assembly design in a particular orientation (e.g., typically horizontal and typically straight) and arranges any branches to extend from the thus-oriented trunk line. As mentioned above, this, it has been found, improves clarity, accuracy, and readability of the flattened version of the electrical harness assembly design, while minimizing, or eliminating, the amount of manual editing required to achieve those ends.

The network interface 108 is a component that enables the computer 100 to connect to any one or more of a variety of external computer-based communications networks, including, for example, local area networks (LANs), wide area networks (WANs), such as the Internet, or the like. In various implementations, the network interface 108 can be implemented in hardware, software, or a combination of hardware and software.

The input/output (I/O) device interface 110 is a component that enables the computer 100 to interface with any one or more input or output devices, such as a keyboard, mouse, display, microphone, speakers, printers, etc. In various implementations, the I/O device interface can be implemented in hardware, software, or a combination of hardware and software. In a typical implementation, the computer may include one or more I/O devices (e.g., a computer screen, keyboard, mouse, printer, touch screen device, etc.) connected to the I/O device interface 110. These I/O devices (not shown in FIG. 1) act as human-machine-interfaces (HMIs) and are generally configured enable a human user to interact with the system 100 to access and utilize functionalities, particularly those related to computer-aided design, flattening and 2D orientation around a trunk line of an electrical harness assembly design, as disclosed herein.

In an exemplary implementation, the computer 100 is connected to a display device (e.g., via the I/O device interface 110) and configured to present at the display device a visual representation of an interface to a product design environment, such as the one provided by and within the SolidWorks® computer program. The interface and its visual representation on the computer-based display device, in a typical implementation, provides the user with access to the flattening functionalities disclosed herein, and displays (e.g., on a display device coupled to the I/O device interface 110) a visual representation of the 3D electrical harness assembly design before flattening and a flattened 2D electrical harness assembly design after flattening, as well as other information that may be included in a formboard drawing of an electrical harness.

In some implementations, the computer 100 and its various components may be contained in a single housing (e.g., as in a personal laptop) or at a single workstation. In some implementations, the computer 100 and its various components may be distributed across multiple housings, perhaps in multiple locations on a network. Each component of the computer 100 may include multiple versions of that component, possibly working in concert, and those multiple versions may be in different physical locations and connected via a network. For example, the processor 102 in FIG. 1 may represent multiple discrete processors in different physical locations working together to perform processes attributable to the processor 102 in a coordinated manner. A wide variety of possibilities regarding specific physical implementations are possible.

In various implementations, the computer 100 may have additional elements not shown in FIG. 1. These can include, for example, controllers, buffers (caches), drivers, repeaters, receivers, etc. Furthermore, the interfaces (e.g., 108, 110) may include elements not specifically represented in FIG. 1, including, for example, address, control, and/or data connections to facilitate communications between the illustrated computer components.

Figure 3:
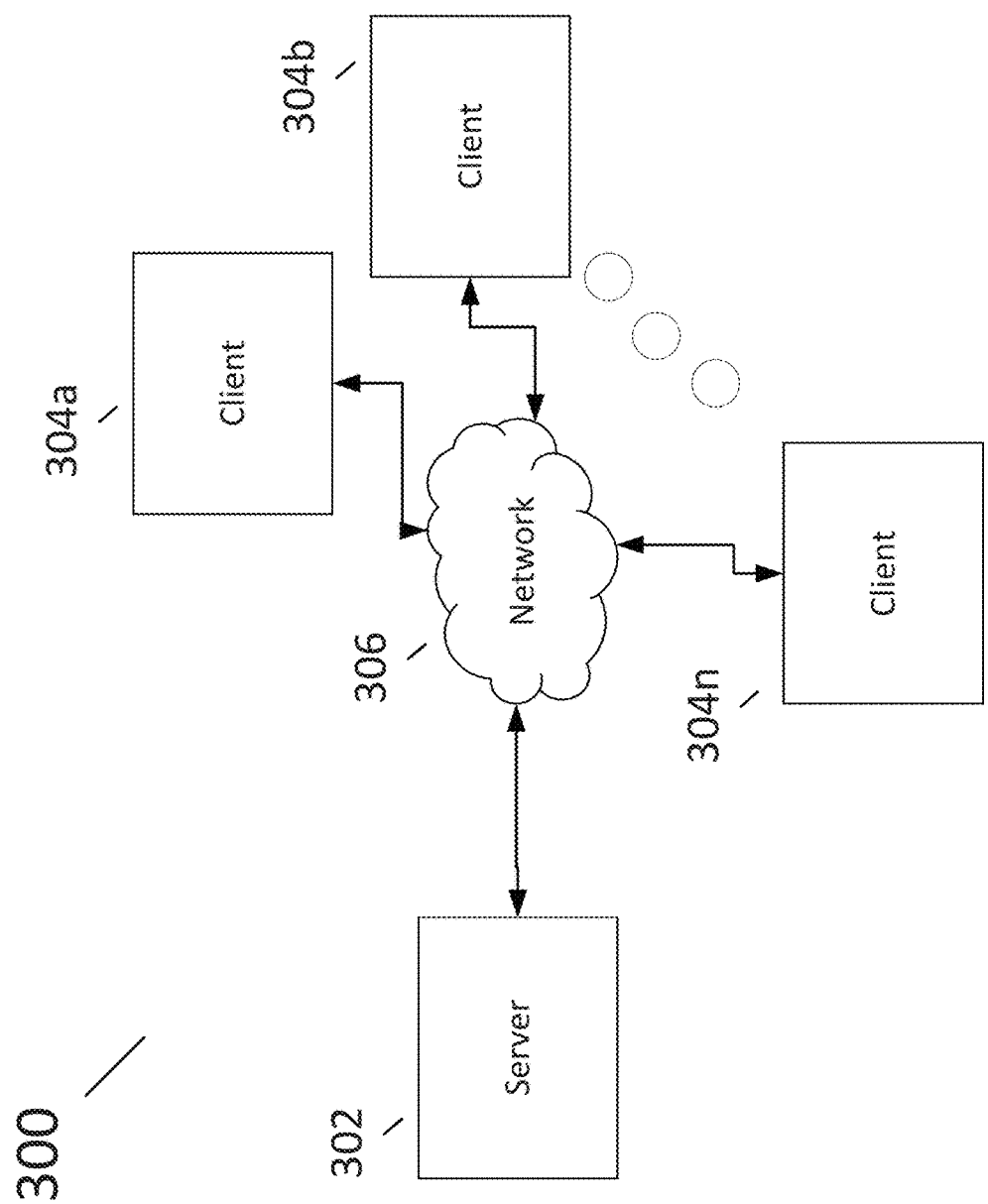
FIG. 3 is a schematic representation of an exemplary computer network environment that may be used to implement the functionalities disclosed herein including, for example, the flattening functionalities.

FIG. 3 is a schematic representation of an exemplary computer network environment 300 that may be used to implement the functionalities disclosed herein including, for example, the flattening functionalities.

The illustrated computer network environment 300 has a server 302, and several client devices 304a, 304b, . . . 304n (or "clients") coupled to one another via a communications network 306. The communications network 306 enables the server 302 and clients 304a, 304b, . . . 304n to communicate and interact with one another. In various implementations, each of the clients 304a, 304b, . . . 304n, and server 302 has the same or similar types of components as those shown in the computer 100 of FIG. 1. For example, in various implementations, each client 304a, 304b, . . . 304n has a processor, computer-based memory, computer-based storage, a network interface, an (optional) I/O device interface 110, and an internal bus that serves as an interconnect between the internal client components. Likewise, in various implementations, the server 302 has a processor, computer-based memory, computer-based storage, a network interface, an (optional) I/O device interface 110, and an internal bus that serves as an interconnect between the internal client components.

In some implementations, each client 304a, 304b, . . . 304n may be configured to perform any one or more (or all) of the flattening functionalities disclosed herein without requiring involvement of the server 302. In some implementations, the flattening functionalities disclosed herein may be distributed between the server 302 and any one or more of the clients 304a, 304b . . . 304n (e.g., the client where a human user is creating the flattened design). In some implementations, a significant portion (or all) of the flattening functionalities disclosed herein may be performed by the server 302 and the clients may simply provide a user interface for the user to access and leverage those flattening functionalities. Various implementations may include one or more servers 302. In implementations that include more than one server, the servers 302 may collaborate with one another and/or with one or more of the clients 304a, 304b . . . 304n to provide or perform the flattening functionalities.

Figure 4:
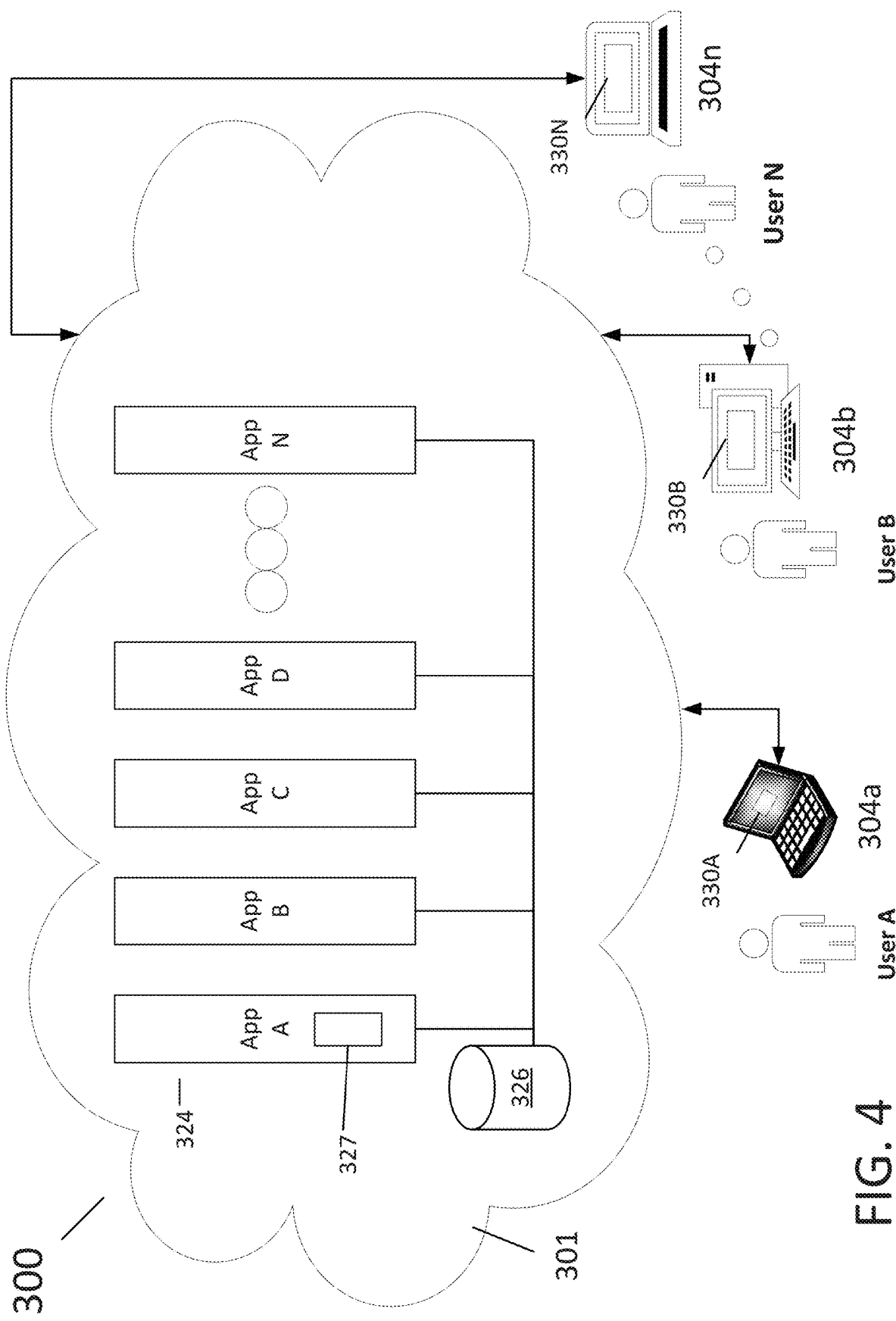
FIG. 4 is a schematic representation showing a detailed implementation of the network environment represented in FIG. 3.

FIG. 4 is a schematic representation showing a detailed implementation of the network environment 300 represented in FIG. 3.

The network environment 300, as represented in FIG. 3, includes a cloud-based collaborative product design and development platform 301 that can be accessed and utilized by any one or more of a plurality of users (User A, User B . . . User N) from any one or more of a plurality of computer-based user workstations 304a, 304b . . . 304n. Each workstation 304a, 304b . . . 304n provides a virtual environment within which the users (User A, User B . . . User N) can work individually and/or collaboratively to design of one or more real-world parts or assemblies (including, e.g., electrical harnesses and/or components or systems that include electrical harnesses), as well as flattening 2D representations of electrical harnesses or other systems or components. The network environment 300 represented in FIG. 3 is particularly well-suited to facilitate creating 3D electrical harness assembly designs and/or efficiently converting 3D electrical harness assembly designs into clean, readable, and highly useful flattened 2D versions of the electrical harness assembly designs.

The product design and development platform 301 in the illustrated network environment 300 has a plurality of software applications (App A, App B, App C, App D . . . App N) 324, and a database 326 that stores data relating to the software applications. In a typical implementation, each software application resides as a set of computer-readable instructions on a computer-readable medium (such as 104 or 106 in FIG. 1) and the database 326 resides as a collection of data organized into a system on a computer-readable medium (such as 104 or 106 in FIG. 1). The data in the database 326 may be entered into the network environment 300 by one or more users (A, B, . . . N) at one or more of the workstations 304a, 304b . . . 304n and/or may be utilized or created by one or more of the software applications (e.g., in a 3D to 2D flattening process).

The product design and development platform 301 can take on any one of a variety of configurations. In one exemplary implementation, the product design and development platform 301 may be based on the 3DEXPERIENCE® computer software platform, available from Dassault Systèmes, the applicant of the current application. In essence, the 3DEXPERIENCE® platform provides a collaborative environment that empowers businesses and users to innovate in highly effective and efficient manners. It provides organizations a holistic, real-time view of their business activity and ecosystem, connecting people, ideas, data, and solutions together in a single environment.

The applications 324 can include any one or more of a variety of different types of computer software applications. Some examples include applications that enable users, individually or collaboratively, to design parts or assemblies, including electrical harnesses, for example. Examples of such applications that may be deployed on Dassault's 3DEXPERIENCE® platform include Solidworks® computer software, with routing capabilities, for use in computer-aided design, computer-aided engineering, computer-aided manufacturing, and visualization. In an exemplary implementation, Software application (App A) in the illustrated implementation is just such a design program.

In the illustrated implementation, App A includes a harness flattening component 327 that supports and facilitates at least some of the functionalities disclosed herein to efficiently converting 3D electrical harness assembly designs into clean, readable, and highly useful flattened 2D versions of the electrical harness assembly designs. The computer-based harness flattening component 327 in the illustrated implementation is shown as being incorporated into App A directly. However, in some implementations, the computer-based harness flattening component 327 may reside elsewhere (including in a separate physical component from App A or any of the illustrated applications 324). Regardless of where and how the harness flattening component 327 is deployed, App A and, in some instances, any one or more of the applications 324 may be configured to access, utilize, and/or leverage its functionalities.

The network environment 300 is configured to present user-specific virtual workspaces (referred to as "user interfaces" 330a, 330b . . . 330n) at each of the user workstations 304a, 304b . . . 304n. Typically, each user interface 330a, 330b . . . 330n produces a visual appearance on a display screen of the workstations that include at least a viewing/editing area where a user can view and/or edit a design, and a variety of user-accessible and user-selectable graphical control elements that when selected or interacted with give the user access to the design flattening functionalities disclosed herein and any one or more of a variety of other computer-based viewing and/or editing/designing tools.

In various implementations, the database 326 may be built upon any one or more of a variety of different computer-based database platforms. In general terms, the database contains an organized collection of data (in this case, the data would be at least related to an electrical harness assembly design) stored electronically (e.g., in 104 or 106 of FIG. 1) and accessible from one or more computers (e.g., 304a, 304b . . . 304n) typically through a database management system. Some of the data stored in the database 326 may be immutable and accessible (but not changeable) by various authorized users of the system (e.g., from any of the user interface devices 304a, 304b . . . 304n). One specific example of database 326 is the Microsoft SQL Server, which a relational database system that stores and that is able to retrieve data as requested (e.g., by users or by other software applications (e.g., 324)) and that includes a relational database management system, developed by Microsoft Corporation. Other database platforms are possible. The stored data may relate to product designs (e.g., electrical harness assembly designs) developed or being developed by users (User A, User B . . . User N), alone or, more likely, collaboratively, using one or more of the applications 324 (e.g., App A). In various implementations, a SQL query engine, for example, may interpret user requests as SQL commands and language to access data stored in a relational database system. A few examples of such query engines are Presto, Apache Drill, Cloudera Impala, and Apache Spark.

The user interfaces 330a, 330b . . . 330n appear on the screens of the workstations 304a, 304b . . . 304n as virtual workspaces. In a typical implementation, each workspace displays design(s) (e.g., of an electrical harness) for users to view and/or modify and/or flatten, as desired. In a typical implementation, if/when a user (at one of the user workstations) requests to access a design (e.g., stored in database 326), the network platform 301 returns a copy of the requested design to that user's workspace. The copy of the requested object that appears in the user interface is generally mutable. In other words, the user is able to modify the copy of the requested design that appears in the workspace. The user is also able to flatten any such design using the functionalities disclosed herein. In some implementations, the user may utilize one or more of the system's applications to make any modifications and/or may use flattening component 327 to perform any flattening. Once the user has made any desired changes (including, e.g., flattening) to the copy of the object that appears in the workspace, that user can publish (or save) the modified/flattened object back to the database 326. When this happens, a new version of the design is saved to the database 326. The new version includes the modifications (or flattening) that the user made in the workspace. Once the new version of the design is added to the database 326, typically, that new version is no longer mutable.

The various components of the product design and development platform 301 and other portions of the network environment 300 are coupled to one another in a manner that enables them to interact with one another and to provide users with access to, among other things, the functionalities related to converting a 3D electrical harness assembly design into a 2D flattened version of the electrical harness assembly design.

The network environment 300 in FIG. 3 has multiple discrete components that may be in several different physical locations. However, in certain implementations, the systems and functionalities disclosed herein may be provided within and made available at a single user computer (e.g., a laptop or desktop computer), such as the computer 100 in FIG. 1 (with appropriate I/O devices, such as a display screen, keyboard, mouse, etc.). In some such instances, the database may be hosted within the computer 100 (e.g., in 104 or 106). In other instances, the database may be external to the computer 100 and accessible, via the network interface 108, to the external database.

Figure 5A:
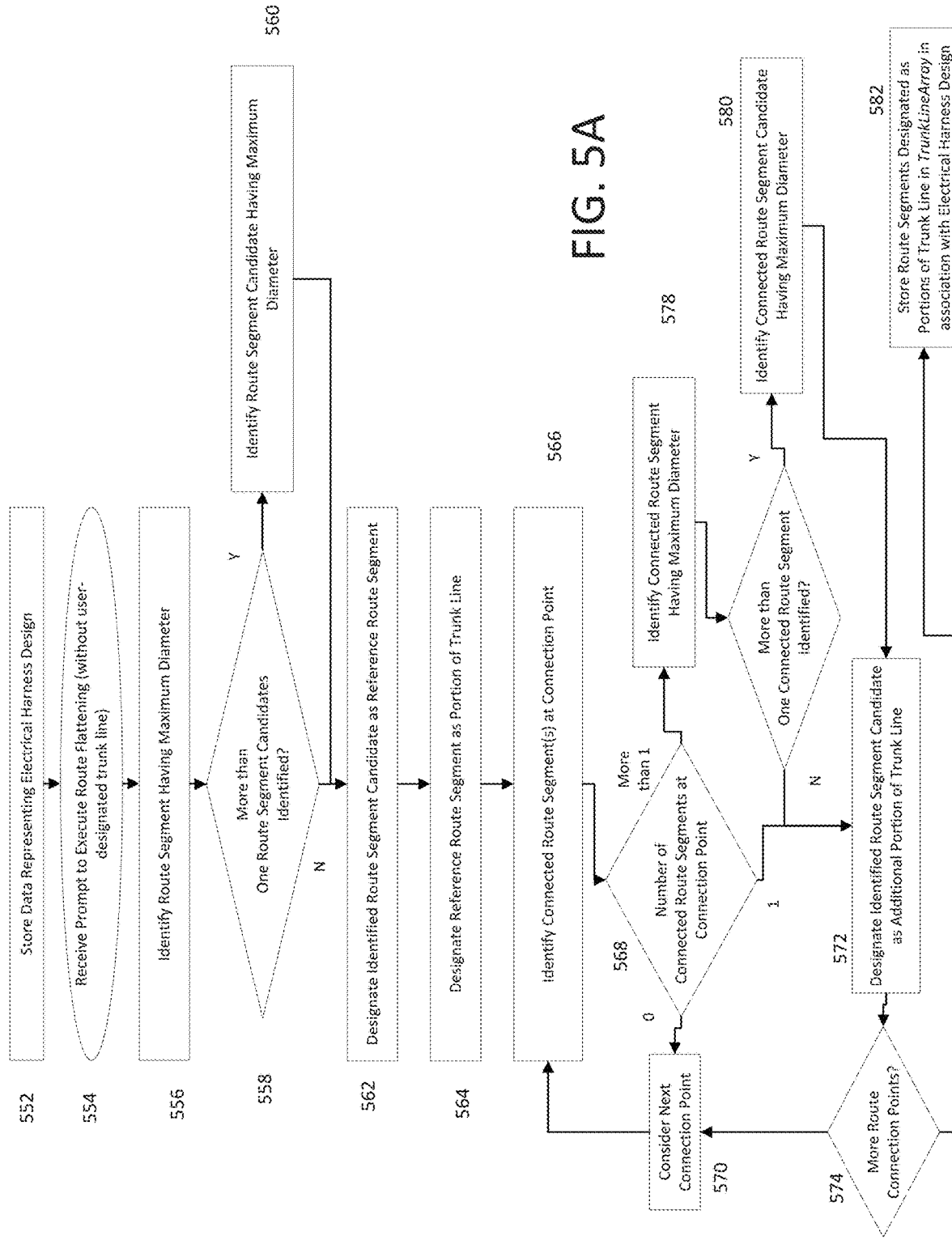
FIGS. 5A-5C are flowcharts that represent an implementation of computer-based electrical harness assembly design flattening process.
Figure 5B:
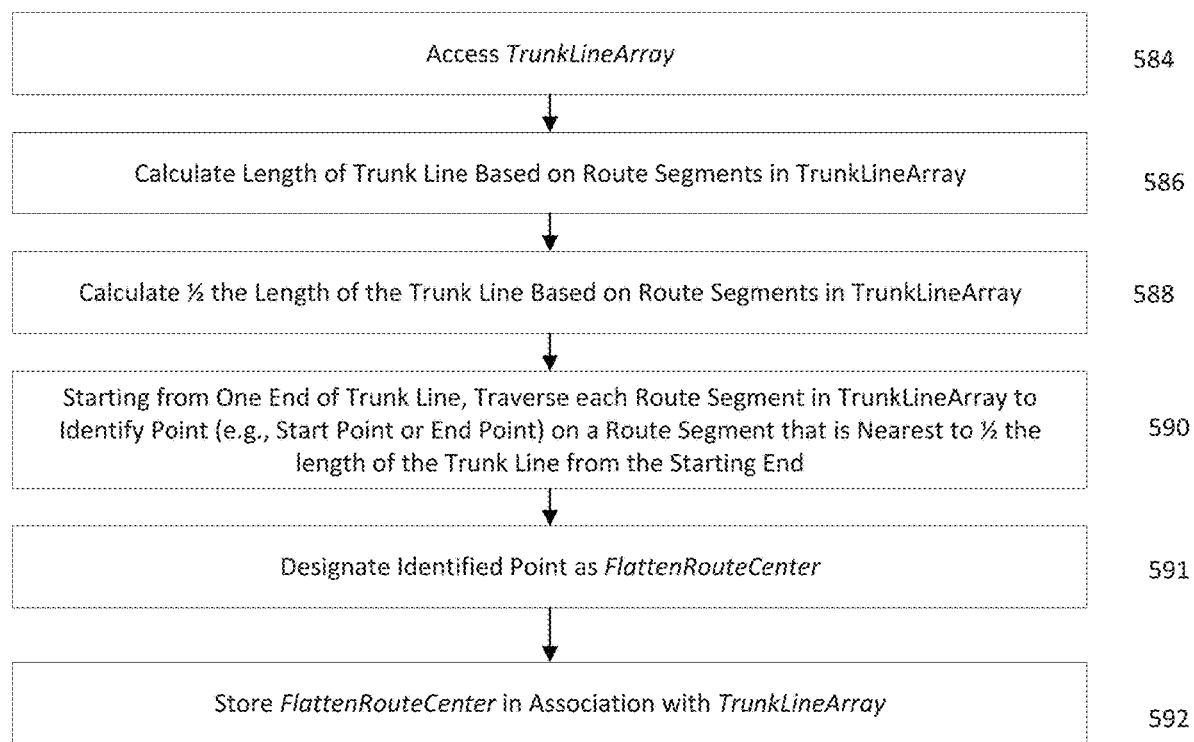
Figure 5C:
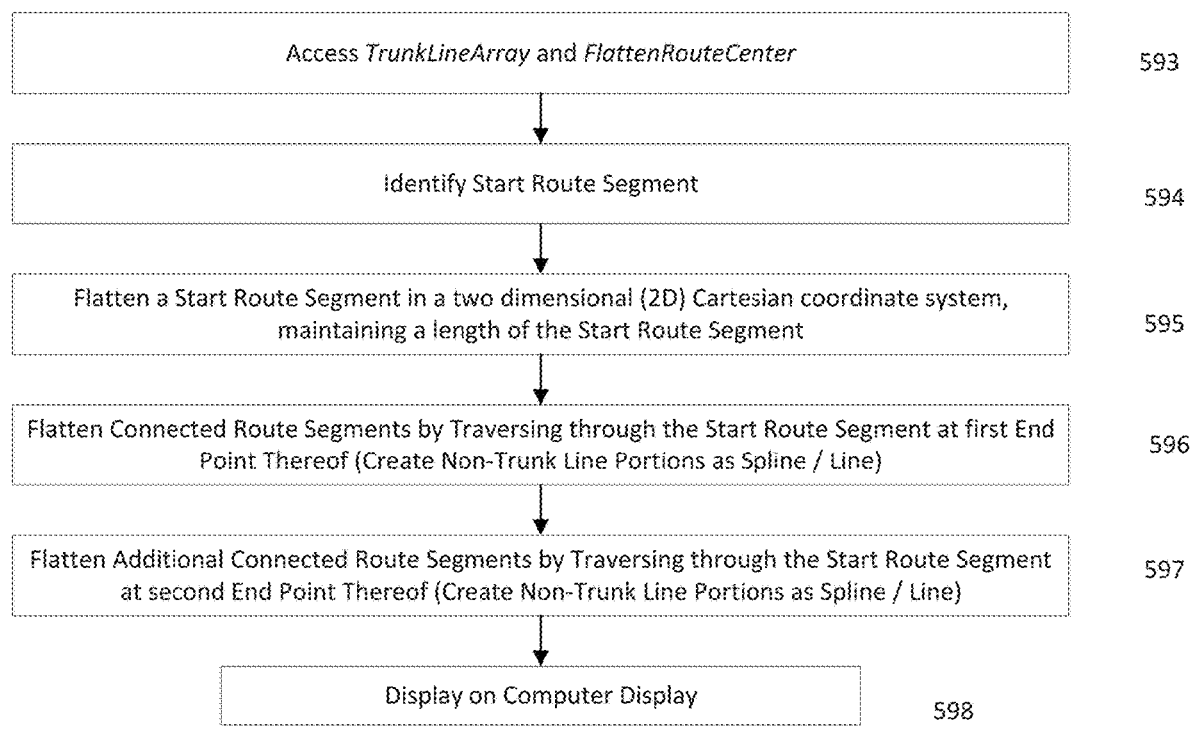

FIGS. 5A-5C are flowcharts that represent an implementation of computer-based electrical harness assembly design flattening process. For ease of discussion, the illustrated process is described herein as being performed with and by the computer 100, such as the one shown in FIG. 1, which would typically include appropriate I/O devices connected to the I/O device interface 110 to facilitate user interactions and viewing capabilities. These I/O devices may include a display screen (touch sensitive or otherwise), a keyboard, a mouse, printer, or any of a variety of I/O devices or combinations thereof that would enable a user to access and leverage the functionalities described herein. Although the description below assumes the processes are being performed by computer 100, it should be noted that the illustrated process could be implemented in any one of a variety of computer-based environments including, for example, those represented in FIG. 3 and/or FIG. 4.

More specifically, FIG. 5A represents an implementation of a process by which the computer 100 automatically (after user-prompting) identifies a trunk line in a pre-existing electrical harness assembly design, FIG. 5B represents an implementation of a process by which the computer 100 automatically identifies a flatten route center in an electrical harness assembly design, and FIG. 5C represents an implementation of a process by which the computer 100 automatically produces and displays a 2D flattened representation of an electrical harness assembly design, based on an identified trunk line and flatten route center.

These processes begin in FIG. 5A (at 552) with the computer 100 storing data that represents a preestablished electrical harness assembly design. The data may be stored, for example, in association with an electrical harness assembly design application, such as the Routing application add-in for the Solidworks® computer application. In general, the Routing application enables users to create special types of subassemblies including, for example, electrical harness assembly designs, made up of components (e.g., electrical connectors, etc.), route parts (e.g., wires, cables, etc.), and route features (e.g., a 3D sketch of the centerline of route path(s)). In a typical implementation, electrical harnesses are initially designed by human user in 3D and subsequently converted into 2D (e.g., in an XY plane) (i.e., flattened) for manufacturing. FIG. 6 shows an example of an electrical harness assembly design with its one trunk line and multiple branches identified therein.

The specific types of data that gets stored for an electrical harness assembly design (at 552) can vary. In one exemplary implementation, the specific types of data that gets stored for an electrical harness assembly design (at 552) includes input data such as route segment identifiers (IDs), route segment diameters, route segment lengths, route segment start and end points, etc. More specifically, in a typical implementation, the data may include: a list of route segment identifiers, a route segment diameter for each listed route segment identifier, a route segment length for each listed route segment identifier, a route segment start point for each route segment identifier, and a route segment end point for each route segment identifier. Typically, this data will have been entered (or input) by one or more human users (e.g., from computer 100 or one or more other computers) when creating the electrical harness assembly design. The data is stored in computer-readable medium, e.g., in the form of a database (e.g., in 104 or 106 in FIG. 1).

Next, according to the illustrated flowchart, the computer 100 (at 554), receives a prompt (or request) from a human user (at computer 100) to automatically execute route flattening. The automatic nature of this route flattening refers to the fact that, after prompting, the computer 100 performs the steps involved in route flattening without further subsequent input from the human user. More specifically, for example, the route flattening process is performed by the computer 100 without the user manually designating the trunk line of the electrical harness, the center point of the trunk line, and/or or the flatten center route of the trunk line, etc. There are a number of ways in which the computer 100 may enable a human user to enter this kind of prompt (or request). Typically, the computer 100 would present, on its display screen, a button or some other graphical control element, the selection of which causes the computer 100 to implement the subsequent steps represented in the illustrated flowchart, for example.

Next, according to the illustrated flowchart, the computer 100 (at 556) identifies the route segment(s) in the electrical harness assembly design that have the largest diameter. As mentioned above, in a typical implementation, the computer 100 will already have been storing (at 552) input data that identifies, among other things, the diameter of each route segment in the electrical harness assembly design. Identifying the route segment(s) having the largest diameter, therefore, is relatively straightforward and can be implemented by the computer 100 in any one of a variety of ways. In one implementation, the computer processor 102 might interrogate the database entries that corresponds to the route segments for the route segment(s) having the largest diameter.

This step (556) can be performed in any number of a wide variety of ways. According to one example, the computer processor 102 compares the various entries for diameter of each route segment in the electrical harness assembly design, in an iterative manner, to identify which of the route segments has the largest diameter. More specifically, the computer processor 102 may start by comparing the diameters of the first and second route segments represented in the database. If the computer processor 102 determines that one of those route segments has a larger diameter than the other, then the computer processor 102 saves the route segment with the larger diameter in a designated memory location (e.g., a buffer) and the smaller diameter route segment is not saved. If the computer processor 102 determines that the two route segments have the same diameter, then the computer processor 102 saves both route segments in the designated memory location. Next, in this example, the computer processor 102 compares the diameter of the saved route segment(s) with the diameter of the next route segment listed or represented in the database. If the computer processor 102 determines that the diameter of the previously saved route segment(s) is larger than the diameter of the next route segment, then the computer processor 102 preserves the previously saved route segment(s) in the designated memory location and does not save the next route segment in the designated memory location. If, on the other hand, the computer processor 102 determines that the diameter of the next route segment is larger than the previously saved route segment(s), then the computer processor 102 removes the previously saved route segment(s) from the designated memory space and saves the next route segment in the designated memory space. If the computer processor 102 determines that the next route segment has the same diameter as the previously saved route segment, then the computer processor 102 adds the next route segment into the designated memory space, so that the previously saved route segments and the next route segments will be saved together in the designated memory location. The computer processor 102 proceeds through all the route segments listed or represented in the database, at the end of which, all of the route segments with the largest (or maximum) diameter will have been saved in the designated memory space. There are, of course, other ways in which the computer 100 may identify (at 556) the route segment(s) with a maximum in an electrical harness assembly design.

Next, according to the illustrated implementation, the computer 100 (at 558) considers whether more than one route segment was identified (in 556) as having a maximum diameter. There are several possible ways that this function can be performed. In one exemplary implementation, the computer processor 102 performs this function by counting the number of entries (or discrete route segments represented) in the designated memory space (e.g., buffer). If the number of entries (or route segments represented) is one, then the computer processor 102 concludes that only one route segment was identified (in step 556) as having a maximum diameter in the electrical harness assembly design. If the number of entries (or route segments represented) is more than one, then the computer processor concludes that more than one route segment was identified (in step 556) as having a maximum diameter in the electrical harness assembly design.

If the computer 100 (at 558) determines that only one route segment was identified (at 556) as having a maximum diameter, then the computer proceeds to step 562 and designates that identified route as a reference route segment.

If the computer 100 (at 558) determines that more than one route segment was identified (at 556) as having a maximum diameter, then the computer 100 (at 560) determines which of the identified (maximum diameter) route segments is longest. As mentioned above, in a typical implementation, the computer 100 will already have been storing (at 552) input data that identifies, among other things, the length of each route segment in the electrical harness assembly design. Determining which of the identified (maximum diameter) route segments is the longest, therefore, is relatively straightforward and can be implemented by the computer 100 in any one of a variety of ways. In one implementation, the computer processor 102 might interrogate the database entries for the identified (maximum diameter) route segments (or the corresponding entries in the designated memory space) for length dimensions of the various route segments.

This step (558) can be performed in any number of a wide variety of ways. According to one example, the computer processor 102 compares the various entries for diameter of each route segment in the electrical harness assembly design, in an iterative manner, to identify which of the route segments has the largest diameter. Like the discussion of step 556, above, this process, in a typical implementation, is an iterative one that involves comparing the lengths of the identified route segments to identify the route segment that is the longest.

Once the computer 100 (at 560) has determined which of the route segments identified at 556 has the greatest length, the computer (at 562) designates that identified route segment as the reference route segment. Next, according to the illustrated implementation, the computer 100 (at 564) designates the reference route segment as a portion of the trunk line in the electrical harness assembly design. In a typical implementation, this may entail saving the route segment information for the reference route segment in TrunkLineArray (e.g., a file) associated with the corresponding electrical harness assembly.

The computer 100 (at 566) then identifies any route segment(s) that are connected to junction points (or end points) of the reference route segment. As mentioned above, in a typical implementation, the computer 100 will already have been storing (at 552) input data that identifies, among other things, a start point for each route segment, and end point for each route segment. Identifying any connected route segment(s), therefore, is relatively straightforward and can be implemented by the computer 100 in any one of a variety of ways.

In one implementation, the computer processor 102 (at 566) might first compare the start point of the reference route segment to the start and end points of other route segments (e.g., other identified maximum diameter segments) represented in the database. If the computer processor 102 identifies any matches between the start point of the reference route segment and the start or end point of any of the other route segments, then the computer processor 102 may designate any such matching route segments as connected route segments.

If the computer processor 102 (at 566) finds only one connected route segment at the start point of the reference route segment, then, according to the illustrated implementation, the computer processor 102 (at 572) designates (in memory) that connected route segment as an additional portion of the trunk line of the electrical harness assembly design. In a typical implementation, this may entail saving the route segment information for the connected route segment in TrunkLineArray associated with the corresponding electrical harness assembly. If the computer processor 102 determines (at 574) that there are more route junction points to consider (e.g., at an opposite end of the reference route segment or at a distal end of one or more route segments subsequently designated a portion of the trunk line), then the computer processor 102 (at 570) proceeds to consider one of these other route junction points.

If the computer processor 102 (at 566) fails to identify any connected route segments at the start point of the reference route segment (see 568), then, according to the illustrated flowchart, the computer processor 102 (at 570) does not designate another route segment as part of the trunk line but instead proceeds to 570 to consider a different junction point. For example, if the computer processor 102 (at 566) fails to identify any connected route segments at the start point of the reference route segment, then the computer processor might next consider the end point of the reference route segment (opposite the start thereof). In that case, the computer processor 102 (at 566 again) would compare the end point of the reference route segment to the start and end points of other route segments (e.g., other identified maximum diameter segments) represented in the database. If the computer processor 102 identifies any matches between the end point of the reference route segment and the start or end point of any of the other route segments, then the computer processor 102 may designate any such matching route segments as connected route segments.

If the computer processor 102 (at 566) identifies more than one connected route segments (e.g., at the start end of the reference route segment), then the computer processor 102 (see 568) identifies (at 578) which of those connected route segment(s) has the largest (or maximum) diameter. This may be performed in a manner like the manner described above (with reference to 556). If (at 578) only one of the connected route segments is identified as having the largest (or maximum) diameter, then the computer processor (at 572) designates that portion as an additional portion of the trunk line. In a typical implementation, this may entail saving the route segment information for the connected route segment having the largest diameter in TrunkLineArray associated with the corresponding electrical harness assembly.

Otherwise, if (at 578) more than one of the identified connected route segments has the same, largest (or maximum) diameter, then the computer processor 102 (at 580) determines which of those has the longest length. This may be performed in a manner like the manner described above (with reference to 560). Next, according to the illustrated implementation, the computer processor 102 (at 572) designates the connected route segment with the largest (maximum) diameter and greatest length as an additional portion of the trunk line. As above, this may entail saving the route segment information for the connected route segment having the largest diameter in TrunkLineArray associated with the corresponding electrical harness assembly.

Next, the computer processor 102 (at 574) considers whether there are any other junction points in the electrical harness assembly design. If so, the computer processor 102 (at 570) proceeds to consider the next junction point. If not, the route segments that have been designated as portions of the trunk line are stored (see 582) in TrunkLineAssembly in association with the corresponding electrical harness assembly design. As discussed below, these route segments are the segments that will, in the processes below, get flattened with a particular orientation (e.g., horizontally) when the electrical harness assembly design is flattened.

FIG. 5B represents an implementation of a process by which the computer 100 automatically identifies a flatten route center in the electrical harness assembly design.

First, according to the illustrated implementation, the computer processor 102 (at 584) accesses TrunkLineArray, which includes various route segment information about the route segments that make up the identified trunk line of the electrical harness assembly design. This information can include, for example, route segment identifiers (IDs), route segment diameters, route segment lengths, route segment start and end points, etc. for each route segment identified (e.g., by the process represented in FIG. 5A) as part of the trunk line.

Next, in the illustrated implementation, the computer processor 102 (at 586) calculates the length of the trunk line based on the route segment information in TrunkLineArray. As mentioned above, the information in TrunkLineArray includes, among other things, the route segment length for each of the route segments that form part of the trunk line. In a typical implementation, the computer processor 102 simply adds up these distances to determine the total length of the trunk line. Moreover, in a typical implementation, this value—total trunk line length (e.g., in inches or centimeters)—is saved in memory (e.g., in association with the electrical harness assembly design).

Next, according to the illustrated implementation, the computer processor 102 (at 588) calculates half the length of the trunk line. This is a simple calculation and typically involves the processor dividing the value of total trunk length by two. The resulting value—half of total trunk length (e.g., in inches or centimeters)—is saved in memory (e.g., in association with the electrical harness assembly design).

The illustrated implementation next has the computer processor 102 (at 590) finding a junction point (e.g., a start point or end point) on one of the route segments that make up the trunk line that is closest to half of the total trunk line from an end of the trunk line. This approximates the trunk line center point and identifies the route segment and junction point closest to the trunk line center point. There are a variety of ways in which this step may be performed. In one example, the computer processor 102 starts at one end of the route segments identified as making up the trunk line and one-by-one adds the lengths of each segment until the total surpasses the previously calculated value for half the total trunk length. Once that point is reached, the computer processor 102 concludes that the route segment that corresponds to the last length added is where the trunk line center point lies. Then, the computer processor 102 can determine which end (e.g., the start point or the end point) of the last added route segment is closest to the trunk line center point.

Next, the computer processor 102 (at 591) designates the point (e.g., route segment start point or end point) identified as being closest to the trunk line center point as the flatten route center. In a typical implementation, the computer processor 102 (at 592) stores this flatten route center (a point along the identified trunk line) as FlattenRouteCenter (in memory) in association with the electrical harness assembly design and the TrunkLineArray.

FIG. 5C represents an implementation of a process by which the computer 100 automatically produces and displays a 2D flattened representation of an electrical harness assembly design, based on the identified trunk line (represented in TrunkLineArray) and the flatten route center (represented in FlattenRouteCenter). As discussed herein, in a typical implementation, the flattening process or algorithm implemented by computer 100 will flatten the route segments represented in the TrunkLineArray horizontally. This may be done, for example, by keep y coordinate in the 2D X-Y plane constant when placing the route segments in the 2D X-Y plane.

According to the illustrated implementation, the process includes a computer processor 102 (at 593) accessing TrunkLineArray and FlattenRouteCenter.

The computer processor 102 then (at 594) identifies a start route segment. In a typical implementation, the computer processor 102 identifies the route segment connected to the FlattenRouteCenter as the start route segment.

Next, in the illustrated implementation, the computer processor 102 (at 595) flattens the start route segment in a 2D Cartesian coordinate system. In a typical implementation, this is done in a manner that preserves the length of the start route segment (as represented in TrunkLineArray).

According to the illustrated flowchart, the computer processor 102 (at 596 and 597) flattens any trunk line route segments identified (e.g., in TrunkLineArray) as being connected, directly or indirectly, to the start route segment. In the illustrated implementation, the computer processor 102 traverses (at 596) the connected trunk line route segments from a first end of the start route segment, and traverses (at 597) the connected trunk line route segments from a second end of the start route segment. Every route segment is positioned with the same orientation (e.g., horizontal and flat) as the start route segment. Thus, in a typical implementation, the route segments that make up the trunk line will be able to appear, when displayed, as a horizontal and flat feature, with a length that, to scale, represents or corresponds to the actual length of the trunk line in the electrical harness assembly design. In a typical implementation, the computer processor 102 represents any non-trunk portions of the electrical harness assembly design in the flattened 2D version of the electrical harness assembly design as splines or lines (e.g., as featured in Solidworks® Routing software) that branch off from the trunk line at appropriate positions along the trunk line.

The illustrated process concludes (at 598) with displaying on a computer display (of computer 100), the flattened 2D version of the electrical harness assembly design, with the trunk line of the electrical harness assembly design having been automatically identified and oriented, on screen, in a particular manner (e.g., flat and horizontal), with branches extending out (either up or down, sometimes at an angle) from appropriate positions along the flattened trunk line. An example of a flattened 2D representation of an electrical harness assembly design produced in accordance with the techniques disclosed herein is shown in FIG. 6 (and FIG. 8). The flattened design on display, in a typical implementation, can be printed, or otherwise shared or communicated across the network, for example.

FIG. 6 shows an example of an electrical harness assembly design 601 that has a trunk line 603 and a plurality of branches 605 that extend from different points along the trunk line 603.

The following description references FIGS. 7A to 7E and details a specific implementation of a computer-based algorithm that may be implemented, for example, by computer 100, to flatten the electrical harness assembly design 601 of FIG. 6. The processes described below as being attributable to computer 100 may include processes performed by one or more subcomponents of computer 100 including, for example, processor 102, memory 104, etc. For ease of reference in the following discussion, various segments and points along the electrical harness assembly design are labeled in FIGS. 7A to 7E.

First, the algorithm identifies the trunk line of the electrical harness assembly design and the center of the flatten harness center, automatically. In a typical implementation, this can include several steps.

Figure 7A:
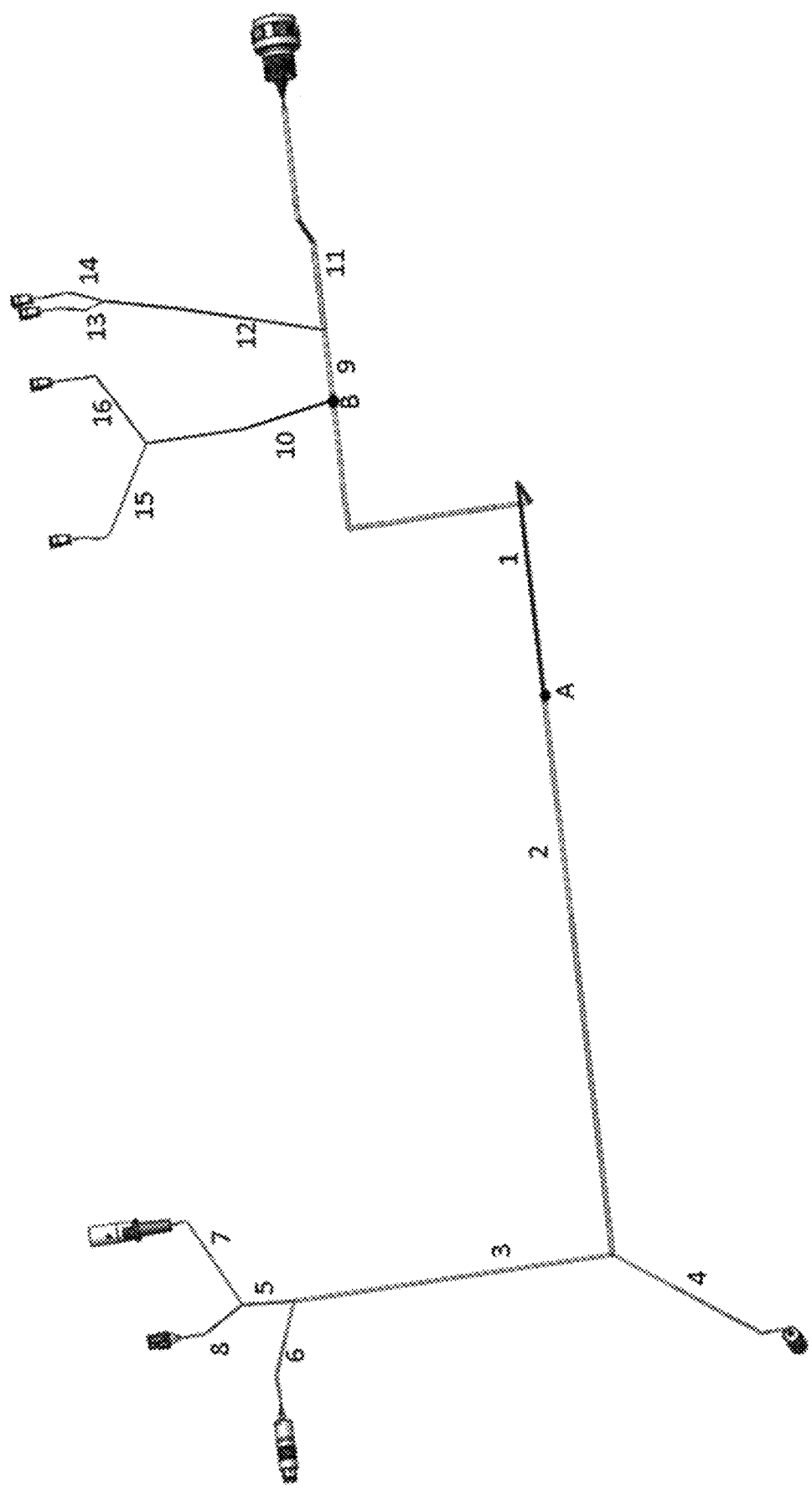
FIGS. 7A-7E show portions of the electrical harness assembly design of FIG. 6.

The first step in this example includes identifying a reference route segment. Typically, in this step, the computer 100 identifies the route segment having maximum diameter in the electrical harness assembly design. In FIG. 7A, let us consider that the computer 100 identifies route segment "1" as having the maximum diameter compared to any other route segment present inside the harness. Because of this, the route segment "1" will be considered, by the computer 100, as the reference route segment to identify the trunk line that will be flattened in the desired orientation (e.g., horizontally). The route segment ID (and perhaps other route segment information) for the maximum diameter route segment "1" is pushed into TrunkLineArray.

Figure 7B:
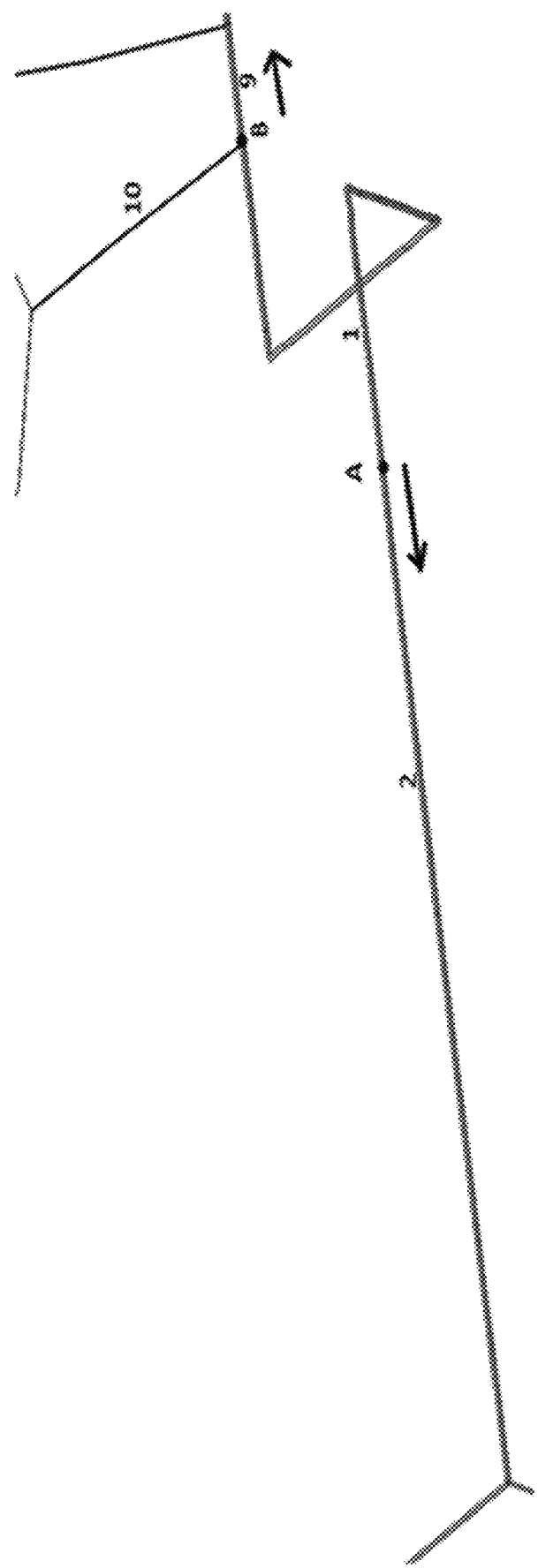

Next, in this example, the computer 100 finds connected route segments. Referring now to FIG. 7B, the computer 100 identifies that route segment "2" is connected at one end (i.e., at point "A") to route segment "1" and that route segments "9" and "10" are connected to an opposite end (i.e., at point "B") of route segment "1." In a typical implementation, the computer 100 will traverse the entire electrical harness assembly design to identify connected route segments. That means identifying the segments that are connected to end points of route segments present inside the TrunkLineArray as shown, for example, by the arrow in the figure. In the illustrated example, only one route segment (i.e., "2") is connected to route segment "1" at point "A," so the computer 100 adds the route segment ID for this route segment ("2") into TrunkLineArray, typically without checking or validating the diameter or length of the route segment ("2").

Figure 7C:
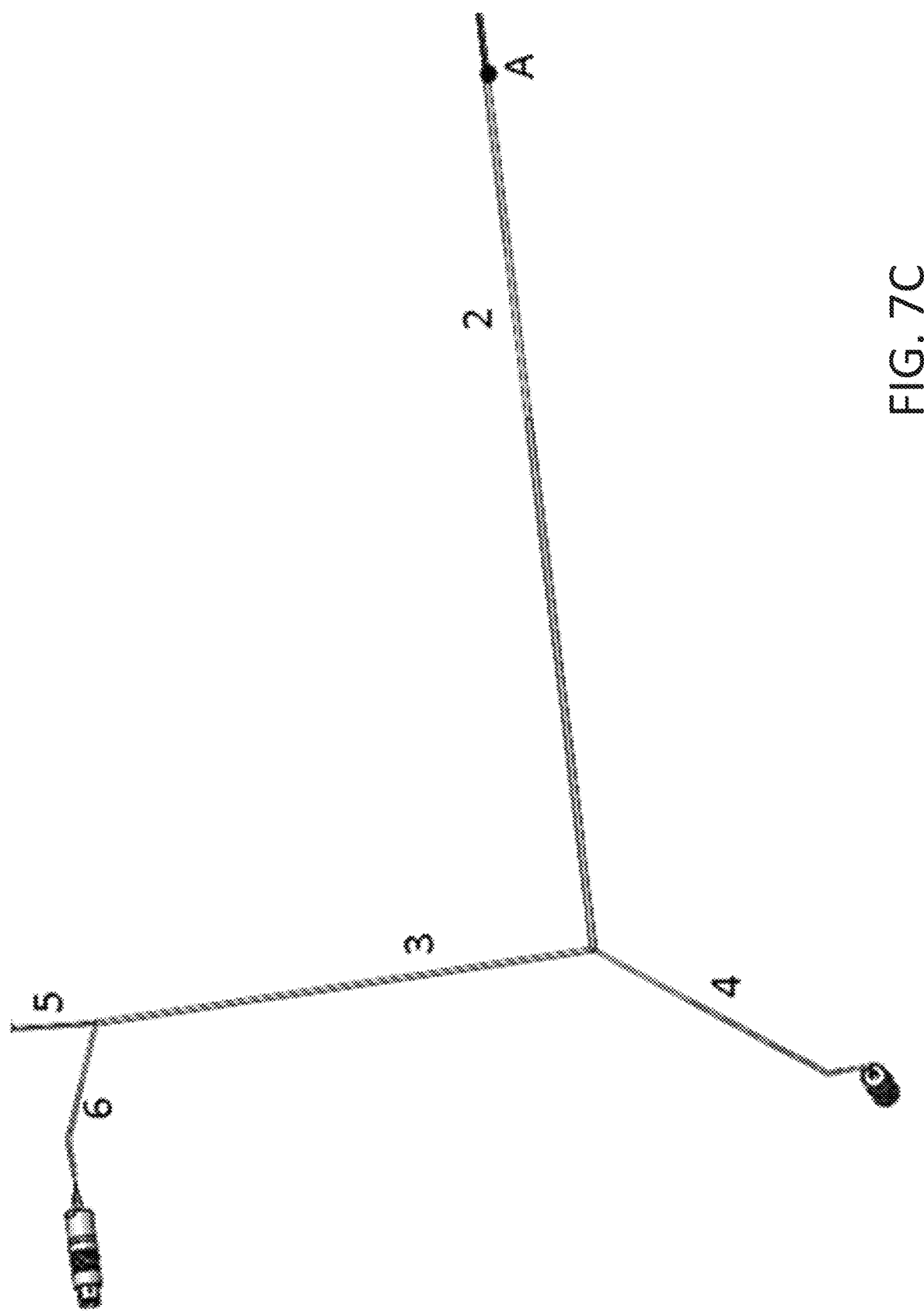

According to the next step in this example, the computer finds connected route segment(s) by traversing the route segment "2" attached to route segment "1" at point "A." In a typical implementation, the computer 100 will choose the next route segment based on the maximum diameter. If more than one of the connected route segments have the same diameter then the computer 100 will choose among those connected route segments, the route segment having the maximum length. Referring now to FIG. 7C, the computer 100 determines that the distal end point of route segment "2" is connected to route segments "3" and "4." The computer 100 will chose which of those route segments ("3" or "4") to add to TrunkLineArray based on which one has the larger diameter, or, if the diameters are equal, then the computer 100 will chose which of those route segments ("3" or "4") to add to TrunkLineArray based on which one is longer. In this example, route segments "3" and "4" have the same diameter, but as is evident from the scale representation in FIG. 7C. route segment "3" is longer than route segment "4." Thus, in this example, once the computer 100 determines that route segment "3" is longer than route segment "4," the computer 100 adds the route segment ID (and perhaps other information) for route segment "3" into TrunkLineArray.

Figure 7D:
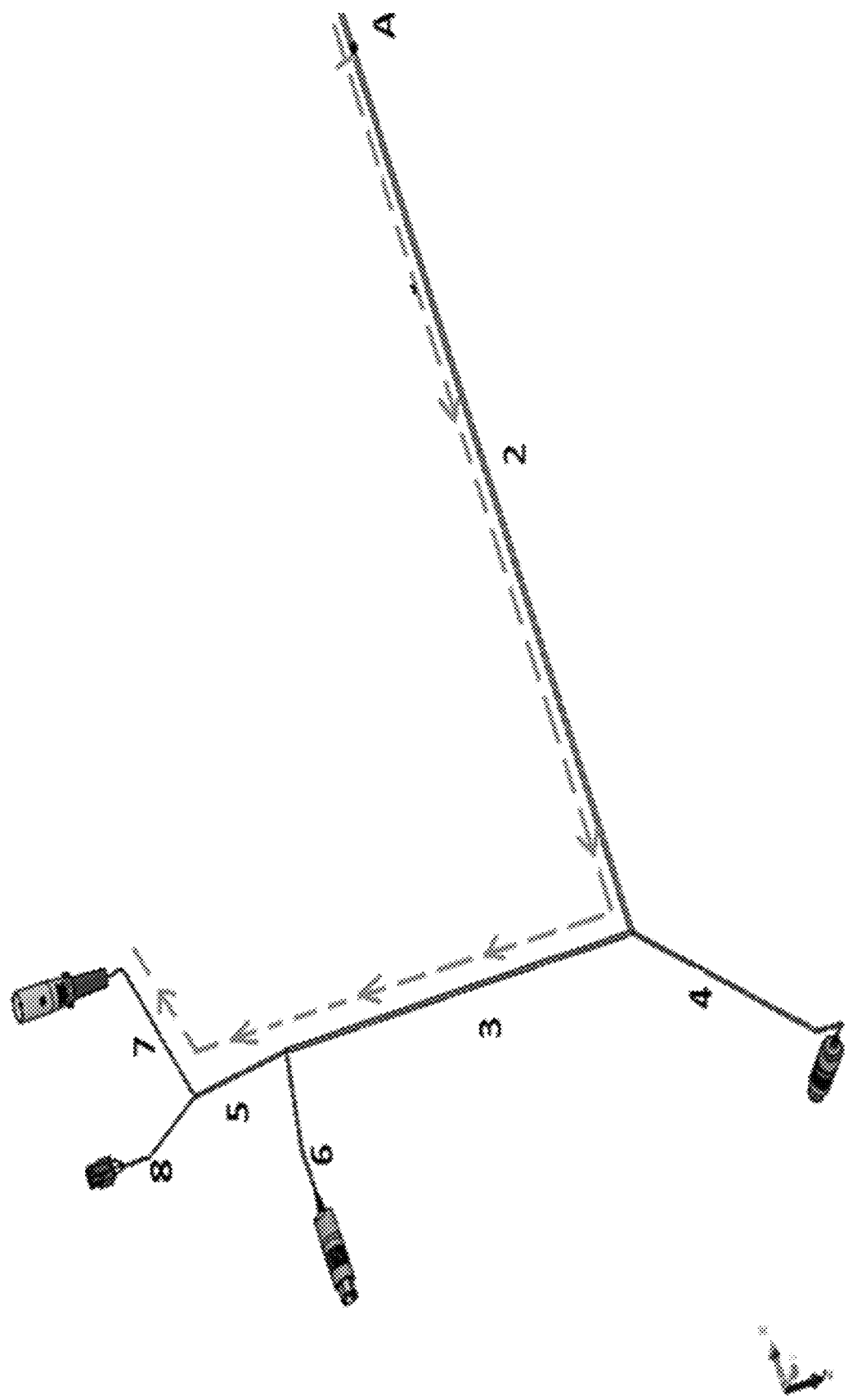

Referring now to FIG. 7D, in a typical implementation, the computer 100 will traverse route segments to an end thereof based on the larger diameter and length criteria discussed above, as represented by the dashed arrowhead line shown in the figure. In essence, the computer 100 continues in this manner until no other connected route segments are found at an end point of the identified route segments in TrunkLineArray. In the illustrated example, this happens at route segment 7. Therefore, in the example represented in FIG. 7D, the computer 100 will find out the route segment ID 2, 3, 5 & 7 by traversing from point "A" at a first end of flatten route segment "1."

Figure 7E:
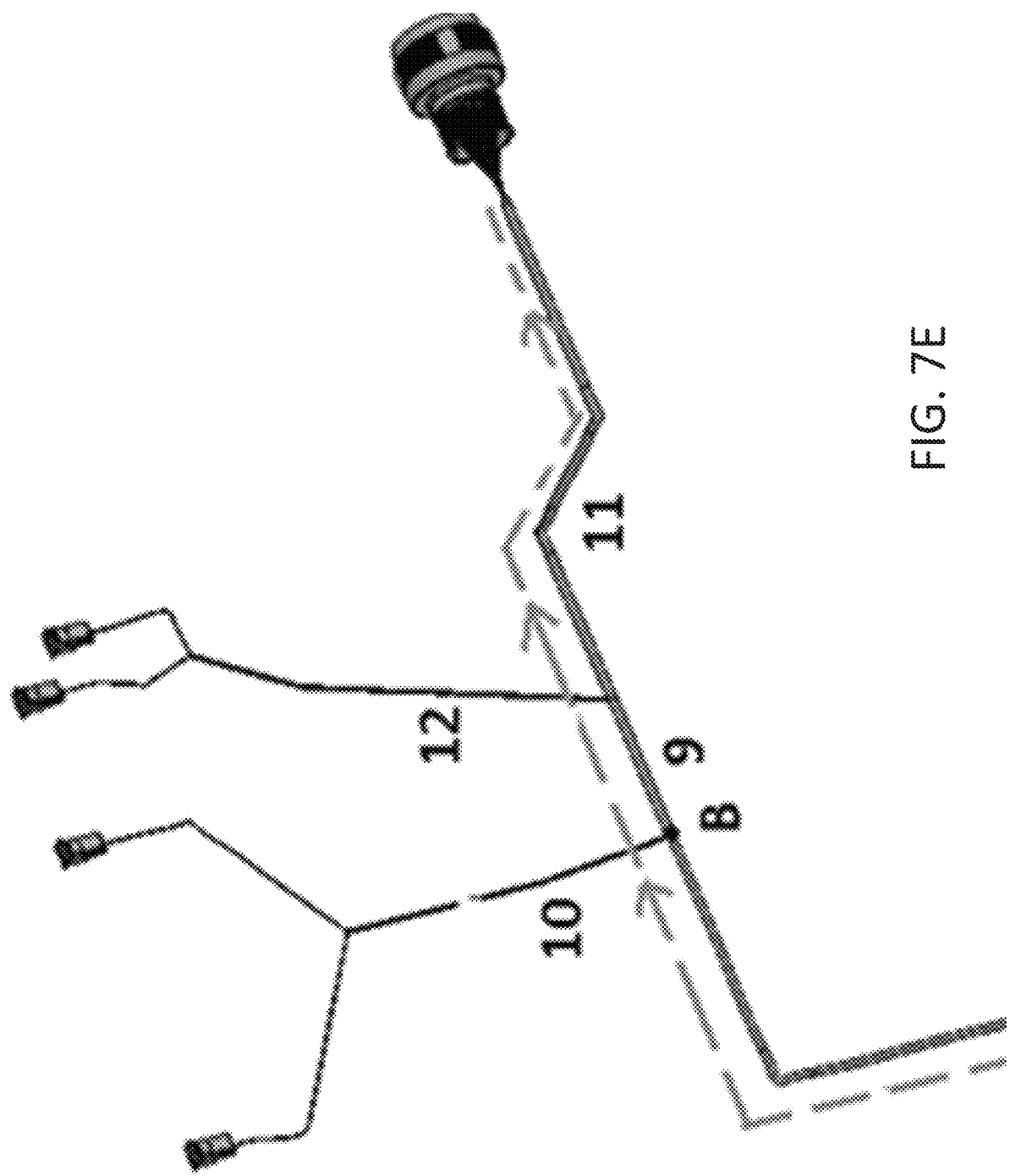

Next, and referring to FIG. 7E, the computer 100 finds connected route segments by traversing the electrical harness assembly design from an opposite end (point "B") of flatten route segment "1." Thus, after completing a traverse from one end of the flatten route segment "1" (i.e., from point "A"), the computer 100 will try to find any route segments connected to other end of the flatten route segment "1" (i.e., from point "B").

Referring now to FIG. 7E, the computer 100 determines there are two route segments (i.e., route segments "9" and "10") connected to point "B." The computer 100 applies the same logic to assess connected route segments (e.g., "9" and "10") while traversing from point "B" as was applied while traversing from point "A." Ultimately, the computer 100, in this example, while traversing the electrical harness assembly design from the point "B" end of the flatten route segment, adds the route segment IDs (and perhaps other route segment information) for route segments 9 and 11 to TrunkLineArray, as reflected by the dashed arrowhead line in FIG. 7E.

In this example, the computer 100, through the processes set forth above, identifies route segments 1, 2, 3, 5, 7, 9, and 11 as making up the trunk line of the electrical harness assembly. This is done by the computer 100 automatically, typically in response to some prompt by the user at computer 100. These identified route segments (1, 2, 3, 5, 7, 9, and 11) are the route segments that will be flattened with a particular orientation (e.g., horizontally) when the computer 100 performs the subsequent flattening operation(s).

Although the computer 100, in some implementations, is configured to automatically identify route segments that make up the trunk line of an electrical harness assembly, etc. Alternatively (or additionally), in some implementations, the computer 100 is configured to enable human users to manually identify the route segments that make up the trunk line of the electrical harness assembly.

Figure 8:
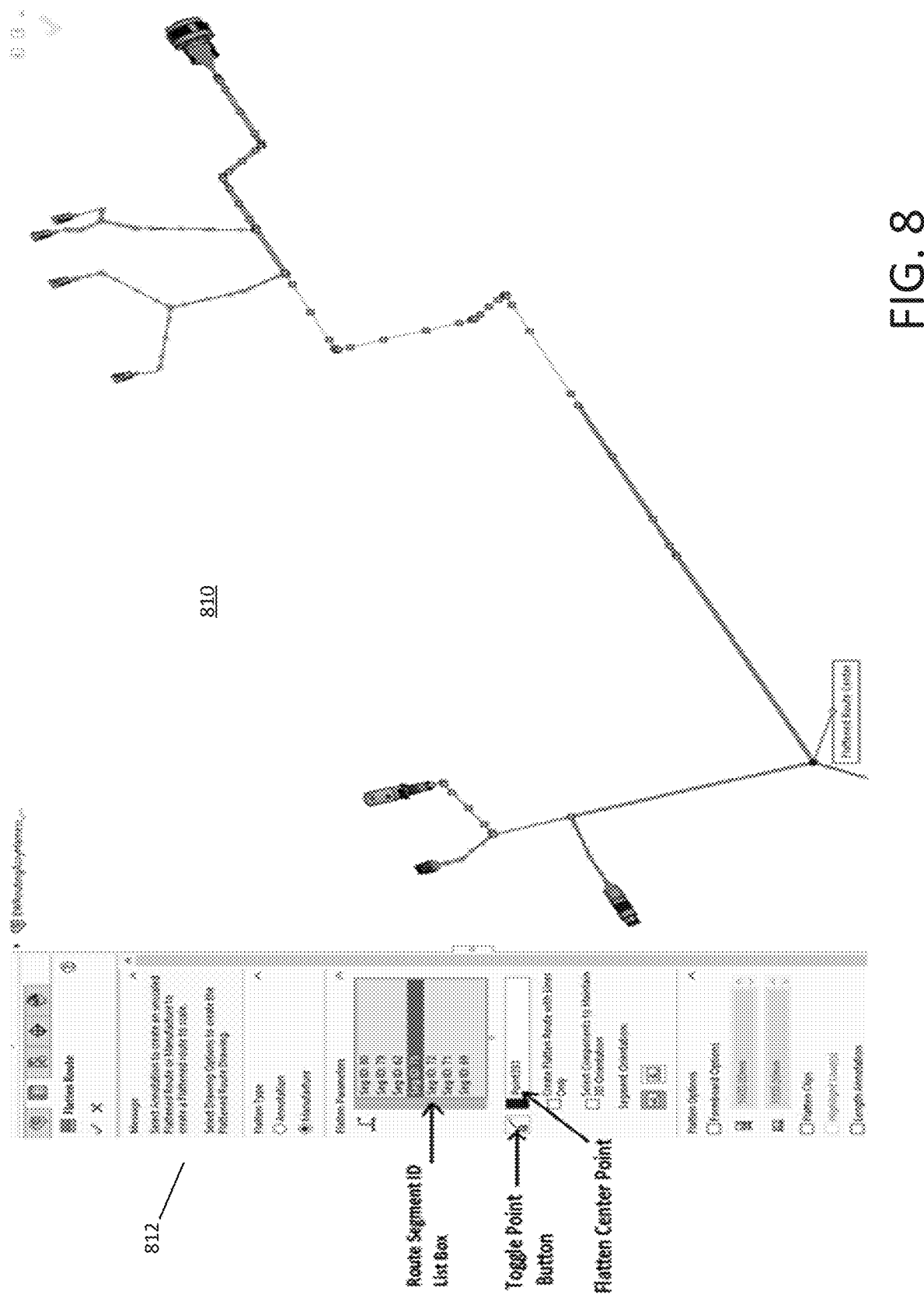
FIG. 8 is a screenshot showing an exemplary implementation of a user interface (e.g., at a display of a computer) that has a design field that shows the electrical harness assembly design of FIG. 6 and a Flatten Route property manager.

FIG. 8 is a screenshot showing an exemplary implementation of a user interface (e.g., at a display of computer 100) that has a design field 810 that shows the electrical harness assembly design of FIG. 6. Each route segment in the electrical harness assembly design that appears in the design field 810 is selectable by the user (e.g., by mouse click or other manner of selection). The illustrated screenshot also has a Flatten Route property manager 812 at a side of the design field 810. The menu 812 has user-selectable features, the selection of which by the user causes the computer 100 to perform one or more functionalities associated with creating a flattened representation of the illustrated electrical harness assembly design.

The illustrated menu 812 includes two options (represented by user-selectable buttons) for flatten type: 1) annotation, which, according to the illustrated menu 812, can be selected by a user to create an unscaled flatten route, and 2) manufacture, which, according to the illustrated menu 812, can be selected by a user to create a flattened route to scale. In the illustrated screenshot, the button corresponding to the manufacture flatten route option has been selected.

Below the flatten type buttons, the menu 812 includes a header that reads "flatten parameters" and a listing of route segment IDs beneath the header. The listed route segment IDs in the illustrated screenshot includes (Seg ID 80, Seg ID 79, Seg ID 62, Seg ID 75, Seg ID 72, Seg ID 71, and Seg ID 69). In some implementations, the route segments that correspond to the listed route segment IDs are those that have been manually selected by a human user (e.g., through mouse manipulation and pointing and clicking to select, etc.) to be included as parts of the trunk line of the electrical harness assembly design. In some implementations, the route segments that correspond to the listed route segment IDs are those that have been automatically identified by the computer 100 (in accordance with procedures set forth herein). In a typical implementation, the route segment IDs (and perhaps other route segment data) for the route segments identified, manually or automatically, as forming the trunk line get saved in TrunkLineArray.

Below the "flatten parameters" listing is a box that contains a point identifier (i.e., a code that identifies a point on the electrical harness assembly design that corresponds to the flatten center point. In the illustrated screenshot, the point identifier box identifies "point 393" as the flatten center point of the electrical harness assembly design. In some implementations, the point that correspond to the point identifier will have been manually selected by a human user (e.g., through mouse manipulation and pointing and clicking to select, etc.). In some implementations, the flatten harness center point is identified automatically by the computer 100 and is an end point of a route segment that is nearest to the center of trunk line. An exemplary process that the computer 100 can use to automatically identifying the flatten route center is discussed below in some detail. In a typical implementation, the flatten center point identifier, whether identified manually or automatically, gets stored in FlattenRouteCenter.

Below the flatten center point box in the flatten route property manager 812, are two user-selectable options that enable users to specify whether to: 1) create flatten routes with lines only, or 2) select components to maintain three-dimensional (3D) orientation. If a user selects the first option (1), then the flattened 2D representation generated by the computer 100 will be formed from 2D lines only. If the user selects the second option (2), then the flattened 2D representation generated by the computer will preserve (or maintain) the 3D appearance of certain components (e.g., connectors, etc.) of the electrical harness assembly design.

Below these two user-selectable options is a pair of user-selectable options that enable the user to specify a segment orientation (e.g., portrait or landscape) for the flattened 2D representation of the electrical harness assembly design. Below that are other options.

The graphical user interface in the illustrated screenshot is based on the SOLIDWORKS® program. In this interface, the user can select one or more route segments to define the trunk line irrespective of maximum diameter or length of any of the route segments. In a typical implementation, criteria that the system 100 imposes on user-selected trunk line route segments is that the selected route segments must form a continuous path from end to end and must not have any part that forms a loop.

There are a variety of ways in which the computer 100 may perform these checks. In one implementation, the computer 100 checks the end points of each selected route segment to determine if there are more than two end points, among the selected route segments, that are not connected to other route segments in the user-selected trunk line. If there are only two end points, among the selected route segments, that are not connected to other route segments in the user-selected trunk line, then the computer concludes that those are end points of the trunk line and the trunk line is considered to satisfy the criteria that the selected route segments form a single continuous path.

In one implementation, the computer 100 determines if the user-selected route segments have any part that forms a loop by checking the end points of the user-selected route segments to determine if any point appears more the twice. If any single point appears more than twice, then the computer 100 concludes that there is a loop.

If the computer 100 determines that the user-selected route segments do not form a single continuous path, or that the user-selected route segments have some portion that forms a loop, then the computer 100 sends an appropriate error message to the user (e.g., on a display of the computer 100). In an exemplary implementation, the error message for a non-continuous path selection will read, "Selections do not form a continuous Route Segment." Moreover, in an exemplary implementation, the error message for a loop will read, "Selected route segment is part of a loop and connected to a splice and is not supported in this selection list." Variations of these messages are possible, too.

User can define the custom trunk line with this implementation and route segments present in defined trunk line will be flattened as horizontal straight line. In a typical implementation, a user can define the trunk line by selecting continuous route segments. These selected route segments IDs are stored in TrunkLineArray. The route segments IDs are listed in selection list box. In addition, the user can either define FlattenRouteCenter by selecting the route segment IDs from the list box and toggle between two ends points (by selecting the toggle point button) or selecting the route segment end point from the GUI.

In some implementations, the flatten route center point can be defined automatically by the computer 100. A prerequisite for this process, in the example set forth below, is TrunkLineArray and the steps, performed by computer 100, are as follows: a) get the stored TrunkLineArray for the electrical harness assembly, b) calculate the length of trunk line by adding up the lengths of all the selected route segments represent in TrunkLineArray, c) calculate a center point position based on total length of trunk line (e.g., if "x is a length of trunk line then the center point of trunk line will be located at x/2 from either end point of the trunk line), and d) starting from one end point of the trunk line, traversing each route segment to find a start or end point of a route segment that is nearest to the x/2 length. The identified point is stored in association with the electrical harness assembly design as FlattenRouteCenter.

Once the route segments of the electrical harness assembly design that make up the trunk line (TrunkLineArray) and the flatten route center (FlattenRouteCenter) have been identified, the computer 100 can proceed to flatten the electrical harness assembly design.

In a typical implementation, flattening the electrical harness assembly design involves placing the entire Electrical Harness on an XY plane and, in some implementations, configuring each route segment such that its length and connection(s) are maintained as per the original 3D version of the design.

In an exemplary implementation, the computer 100 starts to create a flattened representation of an electrical harness assembly design (e.g., on a display of computer 100) from a start route segment (or "start segment"). The start segment may be, for example, a route segment that is connected to the FlattenRouteCenter (e.g., the route segment where the halfway point for the trunk line is located). In a typical implementation, the computer 100 creates one point (e.g., a first end point) of the start segment at an origin of an XY Plane on the display (i.e., at 0.0, 0.0) and a next point (e.g., a second end point, opposite the first) at a location determined based on the length of start route segment, while keeping the Y coordinate constant. Let's say the length of the route segment is "x," for example, then the first end point of the start route segment would be at (0.0, 0.0) and second end point will be at (x, 0.0) and the start route segment would be drawn as a flat, horizontal (relative to the XY plane) line from the first end point to the second end point.

Figure 9A:
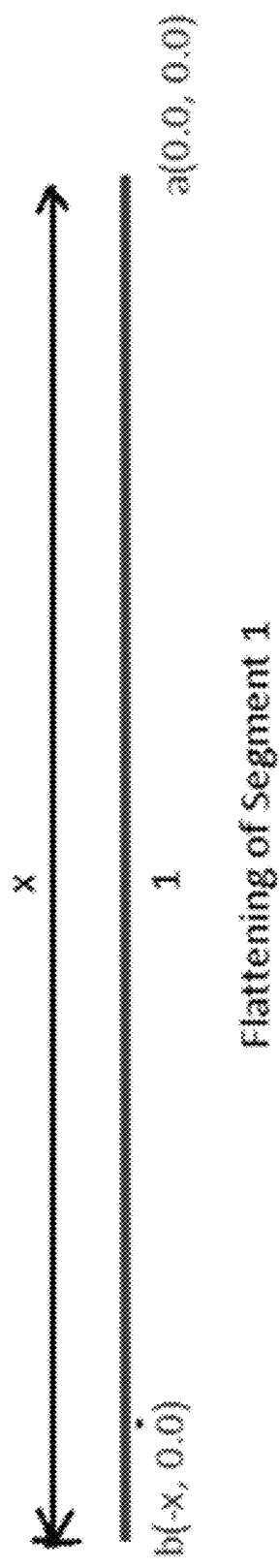
FIGS. 9A-9E show a flattened 2D representation of an electrical harness assembly design at various stages of construction.

Consider, for example, the identified TrunkLineArray discussed above (made up of route segments 1, 2, 3, 5, 7, 9 & 11) and the FlattenRouteCenter discussed above (connected to route segment 1). In that example, route segment 1 would be the start segment and would get flattened first, by the computer 100. That start segment would extend, on an XY plane, horizontally, from point a (0.0, 0.0) to point b (−x, 0.0), where x is the length of the start segment. This is shown, for example in FIG. 9A. The x-axis of the XY plane is shown in the figure but would not necessarily appear on the display screen with start segment "1" (or with the flattened version of the electrical harness assembly design in part or in its entirety). The coordinates ("b (−x, 0.0) and a (0.0, 0.0)) along the x-axis are also shown in the figure but would not necessarily appear on the display screen with the start segment "1."

Next, the computer 100 flattens connected route segments by traversing the electrical harness assembly design (e.g., from the ends of the start route segment (e.g., at point A in FIG. 9A/9B)). More specifically, continuing the example above, the computer 100 determines (e.g., from the end points of route segments 1 and 2) that route segment 2 is connected to point A and notes (from TrunkLineArray) that route segments 2 has been identified as part of the trunk line. Therefore, computer 100 creates a flattened representation of route segment 2 as a horizontal straight line extending from point A on the start route segment. Route segment 2 in this example has a length of x1. Therefore, the distal end of route segment 2 will be located on the XY plane at point c (−x−x1, 0.0).

Figure 9B:
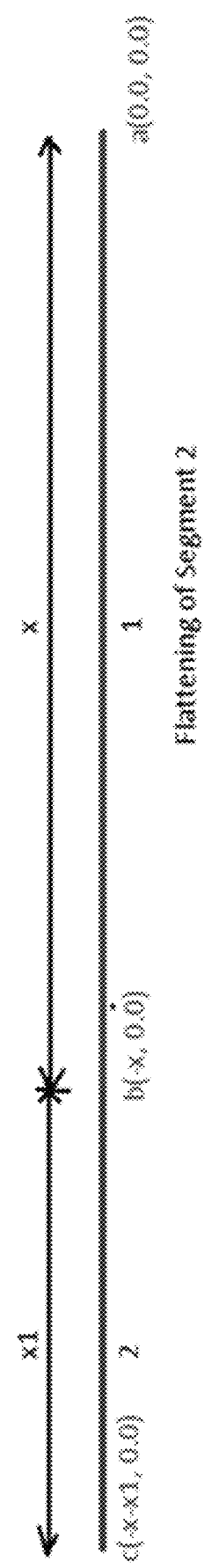

This results in what is shown in FIG. 9B. FIG. 9B shows two route segments—start route segment 1 and connected route segment 2—both having been flagged as part of the trunk line, shown as connected, horizontal, flat lines, having lengths that correspond to their lengths in the electrical harness assembly design. The coordinates of the end points of flatten route segment 2 are b (x, 0.0) and c (−x−x1, 0.0) where x1 is length of the route segment 2.

Figure 9C:
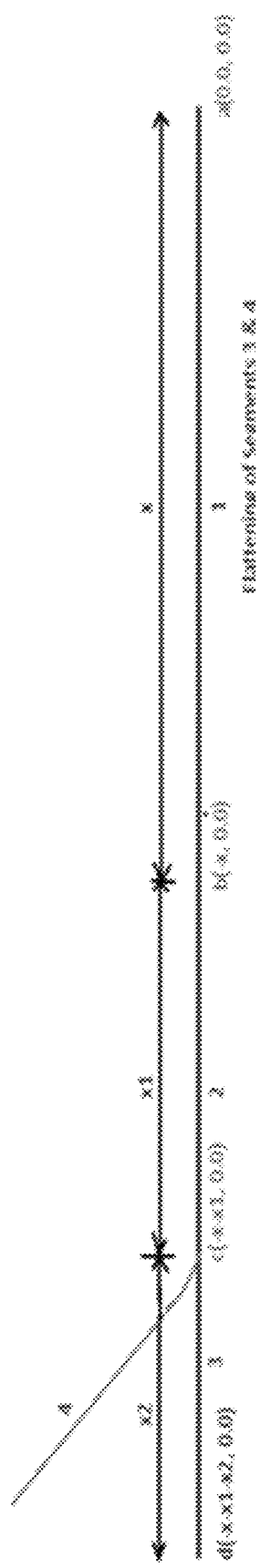

Next, in this example, route segments 3 and 4 are connected to route segment 2 (at point c). Since the computer 100 has identified route segment 3 as being part of the trunk line, route segment 3 will be flattened as a horizontal, flat (straight) line extending from point c away from route segment 2. However, since the computer 100 did not identify route segment 4 as a part of the trunk line, route segment 4 will be flattened with the combination of the spline and line to maintain tangency as shown in FIG. 9C.

Figure 9D:
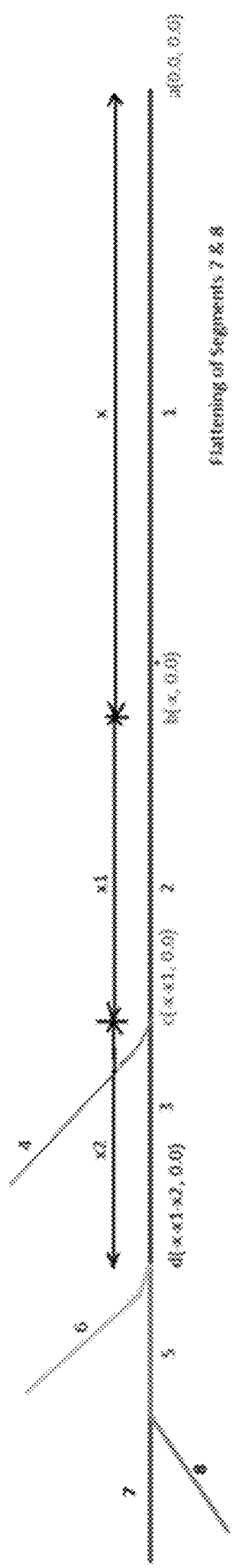

Continuing this example, route segments 5 (part of the trunk line), 6, (not part of the trunk line), 7 (part of the trunk line), and 8 (not part of the trunk line) are flattened in much the same way as discussed above. The flattening of all these route segments is shown in FIG. 9D, where route segments 5 and 7 are created as flat horizontal extensions, whereas route segments 6 and 8 are created with a combination of spline and arc.

Figure 9E:
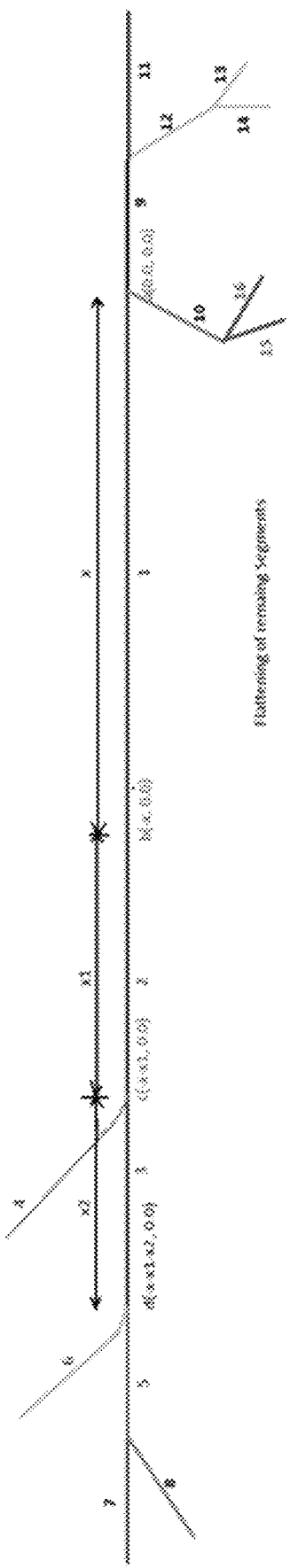

Once the computer 100 has traversed all the route segments that come off of point A of the start segment 1, the computer 100 starts traversing (and flattening) the route segments that come off of point B of the start segment 1. The same logic is used for flattening these route segments (i.e., route segments 9, 10, 11, 12, 13, 14, 15, and 16) as route segments 2, 3, 4, 5, 6, 7, and 8. FIG. 9E shows the end result of this flattening procedure.

A number of embodiments of the invention have been described. Nevertheless, it will be understood that various modifications may be made without departing from the spirit and scope of the invention.

For example, the phrase computer-aided design should be construed broadly to include any computer-based software for designing, engineering, simulating, and/or flattening designs or the like.

In various implementations, certain computer components disclosed herein (e.g., applications, design tools, flattening tools, etc.) can be implemented by one or more computer-based processors (referred to herein as processor) executing computer-readable instructions stored on non-transitory computer-readable medium to perform the associated computer-based functionalities. The one or more computer-based processors can be virtually any kind of computer-based processors and can be contained in one housing or distributed at different locations, and the non-transitory computer-readable medium can be or include any one or more of a variety of different computer-based hardware memory/storage devices either contained in one housing or distributed at different locations.

Certain functionalities are described herein as being accessible or activated by a user selecting an onscreen button or the like. This should be construed broadly to include any kind of visible, user-selectable element or other user interactive element.

The systems and techniques disclosed herein can be implemented in a number of different ways. In one exemplary implementation, the systems and techniques disclosed herein may be incorporated into the Solidworks® computer program available from Dassault Systèmes, the applicant of the current application. In various implementations, the systems and techniques can be deployed otherwise.

It should be understood that the example embodiments described herein may be implemented in many different ways. In some instances, the various methods and machines described herein may each be implemented by a physical, virtual, or hybrid general purpose computer, such as a computer system, or a computer network environment, such as those described herein. The computer/system may be transformed into the machines that execute the methods described herein, for example, by loading software instructions into either memory or non-volatile storage for execution by the CPU. One of ordinary skill in the art should understand that the computer/system and its various components may be configured to carry out any embodiments or combination of embodiments of the present invention described herein. Further, the system may implement the various embodiments described herein utilizing any combination of hardware, software, and firmware modules operatively coupled, internally, or externally, to or incorporated into the computer/system.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to be solely a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification (e.g., aspects of those represented in FIGS. 5A through 5C, and otherwise disclosed herein) can be implemented as operations performed by a data processing apparatus (e.g., a processor/specially programmed processor/computer) on data stored on one or more computer-readable storage devices or received from other sources, such as the computer system and/or network environment described herein. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other implementations are within the scope of the claims.

What is claimed is:

1. A computer-based method of creating a flattened version of a three-dimensional (3D) electrical harness assembly design in a computer-aided design environment, the method comprising:
    storing data in a computer-based memory that identifies route segment identifiers for route segments in the electrical harness assembly design, a diameter for each of the route segments, a length for each of the route segments, and end point locations for each of the route segments;
    designating, with a computer-based processor, one or more of the route segments as forming a trunk line of the electrical harness assembly design, based on the stored data;
    producing a flattened two-dimensional (2D) version of the electrical harness assembly design,
    wherein all the route segments designated as forming the trunk line are represented in the flattened 2D version of the electrical harness assembly design by straight lines, connected to one another, and having a particular orientation on a 2D Cartesian coordinate plane, and
    wherein each of the route segments not designated as forming the trunk line is represented in the flattened 2D version of the electrical harness assembly design extending out from the trunk line; and
    displaying the flattened 2D version of the electrical harness assembly design on a display screen of a computer,
    wherein designating one or more of the route segments as forming the trunk line of the electrical harness assembly design comprises identifying, with the computer-based processor, a reference route segment among the route segments represented in the stored data, wherein the reference route segment is a selected one of the route segments that has a larger diameter than all the other route segments or is a longest one of the route segments that has a larger diameter than all the other route segments, and
    wherein designating one or more of the route segments as forming the trunk line of the electrical harness assembly design further comprises designating, with the computer-based processor, any other of the route segments, besides the reference route segment, as part of the trunk line of the electrical harness assembly design, based on diameter, or diameter and length, using the stored data.

2. The computer-based method of claim 1, wherein the particular orientation of all of the straight lines that represent the route segments designated as forming the trunk line is flat and horizontal on the 2D Cartesian coordinate plane.

3. The computer-based method of claim 1, wherein each route segment represented in the flattened 2D version of the electrical harness assembly design has a length that corresponds to the length for that route segment in stored data.

4. The computer-based method of claim 1, further comprising:
    identifying, with the computer-based processor, a flatten route center for the trunk line based on the stored data and the one or more of the route segments designated as forming the trunk line of the electrical harness assembly design.

5. The computer-based method of claim 4, wherein identifying the flatten route center comprises:
    adding together the length of every one of the segments designated by the computer processor as forming the trunk line of the electrical harness assembly design based on the stored data to produce a calculated length of the trunk line, and
    dividing the calculated length of the trunk line by two to identify a calculated center point of the trunk line.

6. The computer-based method of claim 5, wherein identifying the flatten route center further comprises:
    identifying an end point of one of the route segments designated as forming the trunk line that is closest to the calculated center point of the trunk line as the flatten route center.

7. The computer-based method of claim 6, wherein producing the flattened two-dimensional (2D) version of the electrical harness assembly design comprises:
    designating a particular one of the route segments that is connected to the flatten route center as a start route segment for flattening the electrical harness design; and
    flattening the start route segment, by forming a flat line having a length that corresponds to a length of the start route segment as reflected in the stored data with a horizontal orientation in the 2D Cartesian coordinate plane.

8. The computer-based method of claim 7, wherein producing the flattened two-dimensional (2D) version of the electrical harness assembly design further comprises:
    traversing the electrical harness assembly design from a first end point of the start route to flatten each route segment by:
        flattening any of the route segments designated as forming the trunk line by forming a flat line that extends horizontally out from an end point of a previous flat horizontal line; and
        flattening any of the route segments not designated as forming the trunk line by a visual element that extends from the flat horizontal line(s) in a non-horizontal orientation.

9. The computer-based method of claim 1, wherein the one or more route segments designated as forming the trunk line are connected to one another without any breaks, and do not form a closed loop.

10. The computer-based method of claim 1, further comprising:
    presenting an option for a user to manually designate one or more of the route segments of the electrical harness assembly design as forming the trunk line;
    identifying whether the one or more route segments manually designated as forming the trunk line are connected to one another without any breaks, and do not form a closed loop; and creating an alert if any breaks are identified or if the one or more route segments manually designated as forming the trunk line form a closed loop.

11. A computer-based system for creating a flattened version of a three-dimensional (3D) electrical harness assembly design in a computer-aided design environment, the computer-based system comprising:

one or more computer processing devices; and computer-based memory operatively coupled to the one or more processing devices, wherein the computer-based memory stores computer-readable instructions that, when executed by the one or more processors, cause the computer-based system to:

store data in a computer-based memory that identifies route segment identifiers for route segments in the electrical harness assembly design, a diameter for each of the route segments, a length for each of the route segments, and end point locations for each of the route segments;

designate, with the one or more computer-based processing devices, one or more of the route segments as forming a trunk line of the electrical harness assembly design, based on the stored data;

produce a flattened two-dimensional (2D) version of the electrical harness assembly design, wherein all the route segments designated as forming the trunk line are represented in the flattened 2D version of the electrical harness assembly design by straight lines, connected to one another, and having a particular orientation on a 2D Cartesian coordinate plane, and wherein each of the route segments not designated as forming the trunk line is represented in the flattened 2D version of the electrical harness assembly design extending out from the trunk line; and display the flattened 2D version of the electrical harness assembly design on a display screen of the computer-based system, wherein the particular orientation of all of the straight lines that represent the route segments designated as forming the trunk line is flat and horizontal on the 2D Cartesian coordinate plane, wherein designating one or more of the route segments as forming the trunk line of the electrical harness assembly design comprises identifying, with the computer-based processor, a reference route segment among the route segments represented in the stored data, wherein the reference route segment is a selected one of the route segments that has a larger diameter than all the other route segments or is a longest one of the route segments that has a larger diameter than all the other route segments, and wherein designating one or more of the route segments as forming the trunk line of the electrical harness assembly design further comprises designating, with the computer-based processor, any other of the route segments, besides the reference route segment, as part of the trunk line of the electrical harness assembly design, based on diameter, or diameter and length, using the stored data.

12. A non-transitory computer readable medium having stored thereon computer-readable instructions that, when executed by a computer-based processor, cause the computer-based processor to create a flattened version of a three-dimensional (3D) electrical harness assembly design in a computer-aided design environment, by:

storing data in a computer-based memory that identifies route segment identifiers for route segments in the electrical harness assembly design, a diameter for each of the route segments, a length for each of the route segments, and end point locations for each of the route segments;

designating, with a computer-based processor, one or more of the route segments as forming a trunk line of the electrical harness assembly design, based on the stored data;

producing a flattened two-dimensional (2D) version of the electrical harness assembly design, wherein all the route segments designated as forming the trunk line are represented in the flattened 2D version of the electrical harness assembly design by straight lines, connected to one another, and having a particular orientation on a 2D Cartesian coordinate plane, and wherein each of the route segments not designated as forming the trunk line is represented in the flattened 2D version of the electrical harness assembly design extending out from the trunk line; and displaying the flattened 2D version of the electrical harness assembly design on a display screen of a computer, wherein designating one or more of the route segments as forming the trunk line of the electrical harness assembly design comprises identifying, with the computer-based processor, a reference route segment among the route segments represented in the stored data, wherein the reference route segment is a selected one of the route segments that has a larger diameter than all the other route segments or is a longest one of the route segments that has a larger diameter than all the other route segments, and wherein designating one or more of the route segments as forming the trunk line of the electrical harness assembly design further comprises designating, with the computer-based processor, any other of the route segments, besides the reference route segment, as part of the trunk line of the electrical harness assembly design, based on diameter, or diameter and length, using the stored data.

13. A computer-based method of creating a flattened version of a three-dimensional (3D) electrical harness assembly design in a computer-aided design environment, the method comprising:

storing data in a computer-based memory that identifies route segment identifiers for route segments in the electrical harness assembly design, a diameter for each of the route segments, a length for each of the route segments, and end point locations for each of the route segments;

designating, with a computer-based processor, one or more of the route segments as forming a trunk line of the electrical harness assembly design, based on the stored data;

producing a flattened two-dimensional (2D) version of the electrical harness assembly design, wherein all the route segments designated as forming the trunk line are represented in the flattened 2D version of the electrical harness assembly design by straight lines, connected to one another, and having a particular orientation on a 2D Cartesian coordinate plane, and wherein each of the route segments not designated as forming the trunk line is represented in the flattened 2D version of the electrical harness assembly design extending out from the trunk line; and displaying the flattened 2D version of the electrical harness assembly design on a display screen of a computer; and identifying, with the computer-based processor, a flatten route center for the trunk line based on the stored data and the one or more of the route segments designated as forming the trunk line of the electrical harness assembly design.

14. The computer-based method of claim 13, wherein identifying the flatten route center comprises:

adding together the length of every one of the segments designated by the computer processor as forming the trunk line of the electrical harness assembly design based on the stored data to produce a calculated length of the trunk line, and dividing the calculated length of the trunk line by two to identify a calculated center point of the trunk line.

15. The computer-based method of claim 14, wherein identifying the flatten route center further comprises:

identifying an end point of one of the route segments designated as forming the trunk line that is closest to the calculated center point of the trunk line as the flatten route center.

16. The computer-based method of claim 15, wherein producing the flattened two-dimensional (2D) version of the electrical harness assembly design comprises:

designating a particular one of the route segments that is connected to the flatten route center as a start route segment for flattening the electrical harness design; and flattening the start route segment, by forming a flat line having a length that corresponds to a length of the start route segment as reflected in the stored data with a horizontal orientation in the 2D Cartesian coordinate plane.

17. The computer-based method of claim 16, wherein producing the flattened two-dimensional (2D) version of the electrical harness assembly design further comprises:

traversing the electrical harness assembly design from a first end point of the start route to flatten each route segment by:

flattening any of the route segments designated as forming the trunk line by forming a flat line that extends horizontally out from an end point of a previous flat horizontal line; and flattening any of the route segments not designated as forming the trunk line by a visual element that extends from the flat horizontal line(s) in a non-horizontal orientation.

18. A computer-based method of creating a flattened version of a three-dimensional (3D) electrical harness assembly design in a computer-aided design environment, the method comprising:

storing data in a computer-based memory that identifies route segment identifiers for route segments in the electrical harness assembly design, a diameter for each of the route segments, a length for each of the route segments, and end point locations for each of the route segments;

designating, with a computer-based processor, one or more of the route segments as forming a trunk line of the electrical harness assembly design, based on the stored data;

producing a flattened two-dimensional (2D) version of the electrical harness assembly design, wherein all the route segments designated as forming the trunk line are represented in the flattened 2D version of the electrical harness assembly design by straight lines, connected to one another, and having a particular orientation on a 2D Cartesian coordinate plane, and wherein each of the route segments not designated as forming the trunk line is represented in the flattened 2D version of the electrical harness assembly design extending out from the trunk line; and displaying the flattened 2D version of the electrical harness assembly design on a display screen of a computer; and presenting an option for a user to manually designate one or more of the route segments of the electrical harness assembly design as forming the trunk line;

identifying whether the one or more route segments manually designated as forming the trunk line are connected to one another without any breaks, and do not form a closed loop; and creating an alert if any breaks are identified or if the one or more route segments manually designated as forming the trunk line form a closed loop.

* * * * *